US012804578B2

(12) United States Patent
Guo et al.

(10) Patent No.: US 12,804,578 B2
(45) Date of Patent: Nov. 17, 2026

(54) REFERENCE CELL AND REFERENCE TIMING DETERMINATION FOR MULTIPLE TRANSMISSION-RECEPTION (MULTI-TRP) COMMUNICATIONS

(71) Applicant: QUALCOMM Incorporated, San Diego, CA (US)

(72) Inventors: Shaozhen Guo, Beijing (CN); Mostafa Khoshnevisan, San Diego, CA (US); Fang Yuan, Beijing (CN); Jing Sun, San Diego, CA (US); Xiaoxia Zhang, San Diego, CA (US); Yan Zhou, San Diego, CA (US); Tao Luo, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 264 days.

(21) Appl. No.: 18/718,354

(22) PCT Filed: Feb. 15, 2022

(86) PCT No.: PCT/CN2022/076332
§ 371 (c)(1),
(2) Date: Jun. 10, 2024

(87) PCT Pub. No.: WO2023/155042
PCT Pub. Date: Aug. 24, 2023

(65) Prior Publication Data
US 2025/0063521 A1 Feb. 20, 2025

(51) Int. Cl.
*H04W 56/00* (2009.01)
*H04W 48/20* (2009.01)

(52) U.S. Cl.
CPC ....... *H04W 56/0045* (2013.01); *H04W 48/20* (2013.01)

(58) Field of Classification Search
CPC .......................... H04W 48/20; H04W 56/0045
See application file for complete search history.

(56) References Cited

U.S. PATENT DOCUMENTS

| | | | |
|---|---|---|---|
| 11,129,182 | B2 | 9/2021 | Huang et al. |
| 11,160,041 | B2 | 10/2021 | Abedini et al. |
| 2018/0198665 | A1 | 7/2018 | Guo et al. |

FOREIGN PATENT DOCUMENTS

| | | | |
|---|---|---|---|
| WO | 2019245667 | A1 | 12/2019 |
| WO | 2020033901 | | 2/2020 |
| WO | 2020215108 | A2 | 10/2020 |

OTHER PUBLICATIONS

3GPP TS 38.321, "3rd Generation Partnership Project, Technical Specification Group Radio Access Network, NR, Medium Access Control (MAC) Protocol Specification (Release 16)", 3GPP TS 38.321, V16.2.1 (Sep. 2020), Oct. 6, 2020, 153 Pages, section 3.1.

(Continued)

*Primary Examiner* — James P Duffy
(74) *Attorney, Agent, or Firm* — Harrity & Harrity, LLP

(57) ABSTRACT

A method of wireless communication performed by a wireless communication device includes: communicating a plurality of timing advance group (TAG) indicators, wherein each TAG indicator is associated with at least one cell of a plurality of cells, wherein at least one of the plurality of cells is configured with two CORESET pool index values and two TAG indicators. The method further includes communicating, at a first time based on a first TAG indicator associated with a first reference cell of the plurality of cells, a first communication signal, wherein the first reference cell is based on a number of CORESET pool index values and TAG indicators associated with at least one of the plurality of cells.

30 Claims, 12 Drawing Sheets

(56) References Cited

OTHER PUBLICATIONS

3GPP TS 38.321: "3rd Generation Partnership Project, Technical Specification Group Radio Access Network, NR, Medium Access Control (MAC) Protocol Specification (Release 16)", 3GPP TS 38.321, V16.54.0, Jun. 28, 2021, 158 Pages, section 3.1.
International Search Report and Written Opinion—PCT/CN2022/076332—ISA/EPO—Nov. 7, 2022.
Supplementary European Search Report—EP22926380—Search Authority—The Hague—Oct. 30, 2025.
3GPP TS 38.321: "3rd Generation Partnership Project, Technical Specification Group Radio Access Network, NR, Medium Access Control (MAC) Protocol Specification (Release 16)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V16.3.0 (Dec. 2020), Jan. 6, 2021, Jan. 30, 2021, XP051999701, pp. 1-156, The Whole Document.

REFERENCE CELL AND REFERENCE TIMING DETERMINATION FOR MULTIPLE TRANSMISSION-RECEPTION (MULTI-TRP) COMMUNICATIONS

CROSS-REFERENCE TO RELATED APPLICATIONS

The present application is a 35 U.S.C. 371 National Phase entry of Patent Cooperation Treaty (PCT) Application No. PCT/CN2022/076332, filed Feb. 15, 2022, which is hereby expressly incorporated herein by reference in its entirety.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

It may be desirable or advantageous to align uplink (UL) communications at a BS based on a BS timing configuration. For example, in orthogonal multiple access in which different UEs may communicate in consecutive time resources (e.g., slots), and/or where different UEs may be configured to communicate with the BS simultaneously but in different frequency resources (e.g., carriers, subcarriers), proper timing alignment of the UEs with the BS may reduce or avoid intra-cell interference. The UEs may compensate for the delay (e.g., propagation delay) of UL communications transmitted to the BS by determining and applying a timing advance to the UL communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One aspect of the present disclosure includes a method of wireless communication performed by a user equipment (UE). The method of wireless communication includes: receiving a plurality of timing advance group (TAG) indicators, wherein each TAG indicator is associated with at least one cell of a plurality of cells, wherein at least one of the plurality of cells is configured with two control resource set (CORESET) pool index values and two TAG indicators; and communicating, at a first time based on a first TAG indicator associated with a first reference cell of the plurality of cells, a first communication signal, wherein the first reference cell is based on a number of CORESET pool index values and TAG indicators associated with at least one of the plurality of cells.

Another aspect of the present disclosure includes a wireless communication device comprising a transceiver and a processor configured to: communicate a plurality of timing advance group (TAG) indicators, wherein each TAG indicator is associated with at least one cell of a plurality of cells, wherein at least one of the plurality of cells is configured with two CORESET pool index values and two TAG indicators; and communicate, at a first time based on a first TAG indicator associated with a first reference cell of the plurality of cells, a first communication signal, wherein the first reference cell is based on a number of CORESET pool index values and TAG indicators associated with at least one of the plurality of cells.

Another aspect of the present disclosure includes a non-transitory, computer-readable medium having program code recorded thereon, the program code comprising instructions executable by a processor of a wireless communication device to cause the wireless communication device to: communicate a plurality of timing advance group (TAG) indicators, wherein each TAG indicator is associated with at least one cell of a plurality of cells, wherein at least one of the plurality of cells is configured with two CORESET pool index values and two TAG indicators; and communicate, at a first time based on a first TAG indicator associated with a first reference cell of the plurality of cells, a first communication signal, wherein the first reference cell is based on a number of CORESET pool index values and TAG indicators associated with at least one of the plurality of cells.

Another aspect of the present disclosure includes a wireless communication device comprising: means for communicating a plurality of timing advance group (TAG) indicators, wherein each TAG indicator is associated with at least one cell of a plurality of cells, wherein at least one of the plurality of cells is configured with two CORESET pool index values and two TAG indicators; and means for communicating, at a first time based on a first TAG indicator associated with a first reference cell of the plurality of cells, a first communication signal, wherein the first reference cell is based on a number of CORESET pool index values and TAG indicators associated with at least one of the plurality of cells.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRA WINGS

DETAILED DESCRIPTION

Figure 1:
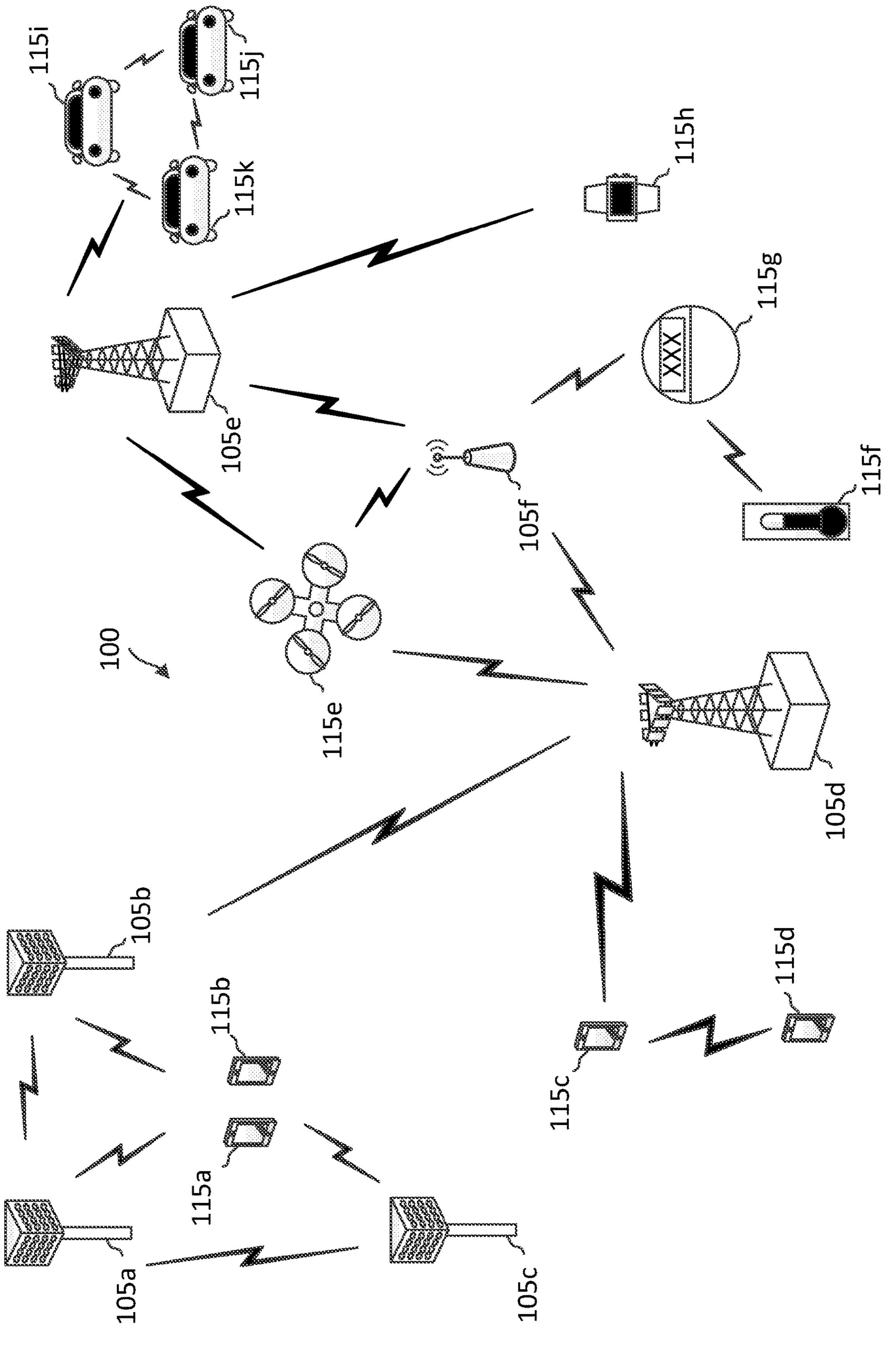
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHZ, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into multiple different frequency ranges, a frequency range one (FR1), a frequency range two (FR2), and FR2x. FR1 bands include frequency bands at 7 GHz or lower (e.g., between about 410 MHz to about 7125 MHz). FR2 bands include frequency bands in mmWave ranges between about 24.25 GHz and about 52.6 GHz. FR2x bands include frequency bands in mmWave ranges between about 52.6 GHz to about 71 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

It may be desirable or advantageous to align uplink (UL) communications at a BS based on a BS timing configuration. For example, in orthogonal multiple access in which different UEs may communicate in consecutive time resources (e.g., slots), and/or where different UEs may be configured to communicate with the BS simultaneously but in different frequency resources (e.g., carriers, subcarriers), proper timing alignment of the UEs with the BS may reduce or avoid intra-cell interference. The UEs may compensate for the delay (e.g., propagation delay) of UL communications transmitted to the BS by determining and applying a timing advance to the UL communications. However, each UE served by the BS may be at a different distance away from the BS and/or have different obstructions between the UE and the BS, and therefore, the UL communications from each UE may have a different propagation delay. Accordingly, one or more of the UEs may autonomously and/or continuously update its timing advance to ensure proper timing alignment with the BS. In other aspects, one or more of the UEs may determine or update the timing advance based on configurations and/or indications provided by the BS. The BS may configure each of the UEs in the network with a timing advance configuration, which may include or indicate a timing advance offset that can be used by the UE to determine a dynamic or autonomous timing advance to apply to UL communications. In some instances, the timing advance applied by each UE may be based on a sum of the timing advance offset and the dynamic or autonomous timing advance.

The UEs may be configured to update the timing advance within a set of parameters. For example, the timing advance configuration may include or indicate a maximum autonomous timing advance adjustment that represents the maximum adjustment to a timing advance a UE can make in a given time period. Further, the UEs and BS may be configured or required to satisfy a maximum error or deviation for proper time alignment with the BS. The maximum error or deviation and/or the maximum autonomous timing advance adjustment may be based on a frequency range of the BS-UE communications (e.g., FR1, FR2), and/or the subcarrier spacing of the BS-UE communications.

In a multi-TRP communication scenario, a UE may be scheduled to communicate with one or more transmission reception points (TRPs). In some aspects, the TRPs may be at different physical locations, and thus may experience different propagation delays for communications to and/or from the UE. Accordingly, the UE may be configured to apply different timing advances to communications between the UE and different TRPs. To determine a timing advance, at least one reference cell may be selected or determined. For example, the UE may be configured for carrier aggregation (CA) to communication with the multiple TRPs using a plurality of cells. In single-DCI multi-TRP communications, a DCI from one of the TRPs may schedule communications for each of a plurality of TRPs. In multi-DCI (mDCI) multi-TRP (mTRP) communications, each TRP may transmit DCI to the UE to schedule communications. In some aspects, one or more of the serving cells may be configured for mDCI multi-TRP communications, and one or more cells may be configured for single-DCI multi-TRP communications or single TRP communications. A cell may be configured for mDCI multi-TRP communications if the cell configuration indicates two control resource set (CORESET) pool index values and/or two timing advance groups (TAGs). For example, a mDCI mTRP cell may be configured with two CORESET pool index values and two TAG indicators. A single-DCI mTRP cell or single-TRP cell configuration may indicate a single TAG indicator and/or a single CORESET pool index value.

To determine a timing advance for UL communications in CA, multi-TRP scenario, a reference cell may be selected, and a timing advance may be applied relative to DL signal timing on the reference cell. When a cell is configured for mDCI multi-TRP communications, UL signals on the cell may be transmitted to one of multiple TRPs. For example, the mDCI mTRP cell may be configured with multiple TAGs to allow for different timing advance to be applied to communications for either TRP. Further, the UE may be configured with other cells that are configured with a single TAG indicator and/or a single CORESET pool index value. Accordingly, there may be multiple reference cell candidates in the CA multi-TRP communication scenario. However, not all cells may be configured with the same combinations of TAG indicators or CORESET pool index configurations. In this regard, not all cells may be suitable as a reference cell for communications associated with at least one TRP, at least one TAG, and/or at least one CORESET pool index configuration.

The present disclosure describes schemes and mechanisms for selecting reference cells and determining reference timings and timing advances for UL communications in a multi-TRP communication scenario. For example, a UE configured to communicate using multiple cells, where at least one cell is configured for mDCI multi-TRP communication, may select at least one reference cell based on a number of TAG indicator values and/or a number of CORESET pool index values associated with at least one of the configured cells. For example, the UE may select a reference cell from a set of cells where the set of cells is defined such that at least one cell that is configured with two CORESET pool index values and two corresponding TAGs, the other cells or CCs are configured with one of both TAGs (same as one or both of the TAGs configured for the at least one cell). In one example, the UE may be configured to select a reference cell based on the reference cell being configured with two TAG indicators and/or two CORESETPoolIndex values. In another example, the UE may be configured to select a special cell (SpCell) as a reference cell if the SpCell is configured with two TAG indicators and/or two CORESETPool Index values. If the SpCell is not configured with two TAG indicators and/or two CORESETPoolIndex values, for example, the UE may select the SpCell as a first reference cell for a primary TAG (pTAG), and at least one secondary cell (SCell) as a second reference cell for a secondary TAG (sTAG). In another example, the UE may be further configured to select a reference cell for each TAG of a plurality of configured cells that include that TAG. For primary TAG (pTAG), the UE may use the special cell (SpCell) as the reference cell. For sTAG, the UE may use any activated cells (either SpCell or Scell) that include that sTAG as the reference cell. If SpCell is one of the cell that include the STAG, for example, the UE may use the SpCell as the reference cell.

In another aspect, a UE may determine one or more reference timings based on one or more selected reference cells. For example, a serving cell may be configured with more than one TAG indicator and/or more than one CORESETPoolIndex value. In some aspects, the UE may determine a first DL reference time based on the reception of the first detected path (in time) of a corresponding DL signal on the reference cell associated with the first configured CORESETPoolIndex value. The UE may further determine a second DL reference time based on the reception of the first detected path (in time) of a corresponding DL signal on the reference cell associated with the second configured CORESETPoolIndex value. In other aspects, the UE may determine a single reference timing for all communications in the multi-TRP communication scenario. The UE may determine the single reference timing based on the reception of the first detected path (in time) of a corresponding DL signal on the reference cell associated with a specific CORESET pool index value. In this regard, the network may be configured to indicate timing advance commands for communications of each TRP relative to the single reference timing. In another aspect, the UE may determine one reference timing for each of two or more selected reference cells. The UE may determine the first DL reference timing based on the reception of the first detected path (in time) of a corresponding DL signal on the first reference cell associated with the first CORESET pool index. The UE may determine the second DL reference timing based on the reception of the first detected path (in time) of a corresponding DL signal on the second reference cell associated with a second CORESET pool index different from the first CORESET pool index of the first reference cell. In another aspect, the UE may determine one reference timing for each configured TAG. If the reference cell for a given TAG is configured with two CORESET pool index values and two TAGs, the UE may determine the DL reference timing based on the detection of the first detected path (in time) of a corresponding DL signal on the reference cell associated with the CORESET pool index that is associated with the given TAG. Other aspects are also described below.

The schemes and mechanisms of the present disclosure advantageously allow for m-DCI based multi-TRP communications with carrier aggregation (CA). Accordingly, the UE and the network may have additional communication flexibility for more robust communications and higher throughput while maintaining sufficient time domain orthogonality for UL communications received at the wireless node. Accordingly, throughput and efficiency may be increased, latency may be decreased, and user experience may be improved. For the purposes of the present disclosure, a CORESET pool index value may be referred to as a DL control channel monitoring group indicator value. In this regard, a CORESET pool may be associated a group of wireless communication devices configured to monitor for DL control information in one or more CORESET resources configured for the CORESET pool.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*l*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (COMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-action-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. an UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT. The goal of LBT is to protect reception at a receiver from interference. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW). For instance, a transmitting node may draw a random number and backoff for a duration based on the drawn random number in a certain time unit.

In some aspects, one or more of the UEs 115 may be configured to communicate with two or more of the BSs 105 in a multi-transmission-reception point (multi-TRP) communication scenario. For example, a UE 115 may be configured with a first frequency band or cell, where the cell is configured for communications on more than one TRP. The UE 115 may receive DL communications (e.g., DCI, PDSCH, DL reference signals) from each TRP. The UE 115 may also transmit UL communications to one or more of the TRPs. Because the TRPs may be at different locations, different timing advances may be applied to UL communications for the TRPs, as explained below.

Figure 3:
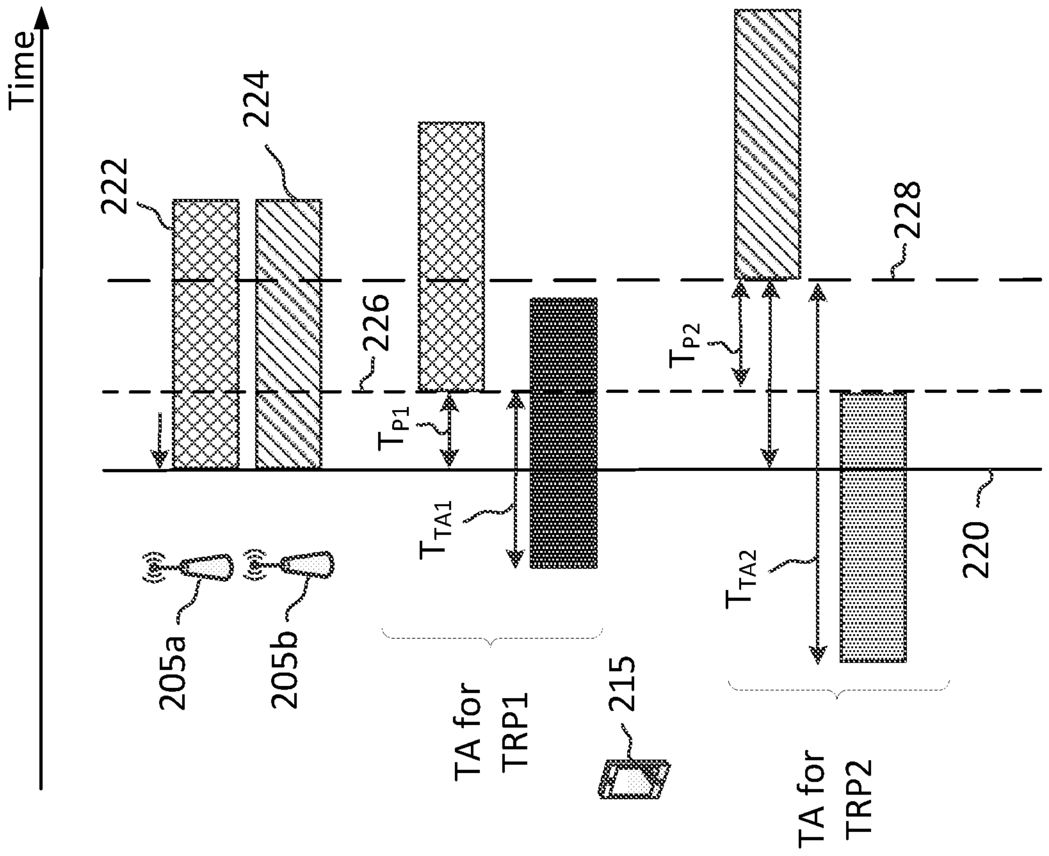
FIG. 3 is a timing diagram for timing advance in a mTRP communication scenario, according to aspects of the present disclosure.
Figure 2:
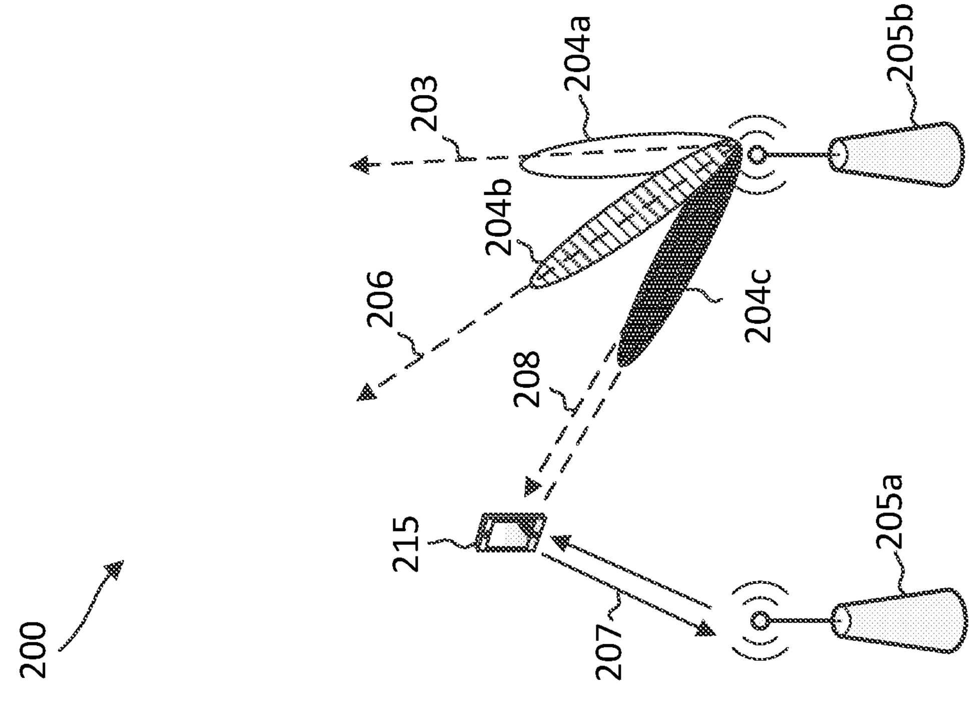
FIG. 2 illustrates a multiple transmission reception point (mTRP) communication scenario according to some aspects of the present disclosure.

FIGS. 2 and 3 illustrate a multiple transmission-reception point (multi-TRP) communication scenario 200 according to aspects of the present disclosure. The communication scenario 200 involves a first TRP 205*a*, a second TRP 205*b*, and a UE 215. In some aspects, one or both of the TRPs 205 may be one or more of the BSs 105 of the network 100. In other aspects, one or both of the TRPs 205 may be another type of wireless node or wireless communication device configured for communication with one or more UEs in a network. In some aspects, the UE 215 may be one of the UEs 115 of the network 100. For simplicity, FIG. 2 illustrates one UE 215 and two TRPs 205, but a greater number of UEs 215 (e.g., about 2, 3, 4, 5, 6, 7, 8, 9, 10, or more) and/or TRPs 205 (e.g., the about 2, 3, 4 or more) may be supported. In the scenario 200, the TRPs 205 and the UE 215 communicate with each other over at least one radio frequency band. For example, the TRPs 205 may be configured to communicate with the UE 215 on one or more cells corresponding to one or more frequency bands. In some aspects, each of the one or more cells corresponds to a component carrier (CC). In other aspects, each of the one or more cells corresponds to a bandwidth part (BWP). The one or more cells may include a primary cell (PCell) or special cell (SpCell).

In some aspects, one or both of the TRPs 205 may be capable of generating a number of directional transmission beams in a number of beam or spatial directions (e.g., about 2, 4, 8, 16, 32, 64 or more) and may select a certain transmission beam or beam direction to communicate with the UE 215 based on the location of the UE 215 in relation to the location of the TRPs 205 and/or any other environmental factors such as reflectors and/or scatterers in the surrounding. For example, the second TRP 205*b* may select a transmission beam that provides a best quality (e.g., with the highest receive signal strength) for transmission to the UE 215. The TRP 205*b* may also select a reception beam that provides a best quality (e.g., with the highest receive signal strength) for reception from the UE 215. As illustrated in FIG. 2, the TRP 205*b* may generate three beams 204*a*, 204*b*, and 204*c*. The TRP 205*b* may determine that it may utilize the beam 204*b* or the beam 204*c* to communicate with the UE 215, for example, based on a beam discovery or beam selection procedure.

As explained above, one or both of the TRPs 205 may schedule the UE 215 for an UL communication or a DL communication over a frequency band. For the purposes of the present disclosure, a frequency band may include a component carrier (CC) and/or a bandwidth part (BWP), for example. In single-DCI multi-TRP communications, a DCI from one of the TRPs (e.g., TRP 205*a*) may schedule communications for the first TRP 205*a* and the second TRP 205*b*. In multi-DCI (mDCI) multi-TRP communications, each TRP 205 may transmit DCI to the UE 215 to schedule communications. FIG. 2 may illustrate a mDCI multi-TRP communication scenario, whereby the first TRP 205*a* schedules DL and/or UL communications with the UE 215 by a first communication link 207, and the second TRP 205*b* schedules DL and/or UL communications with the UE 215 by a second communication link 208. In some aspects, a UE 215 may be configured with carrier aggregation to communicate with one or both of the TRPs 205 using one or more serving cells. The serving cells may include, for example, a primary cell (PCell), one or more secondary cells (SCells), a PUCCH secondary cell (PSCell), and/or a special cell (SpCell). In some aspects, one or more of the serving cells may be configured for mDCI multi-TRP communications, and one or more cells may be configured for single-TRP communications. A cell may be configured for mDCI multi-TRP communications if the cell configuration indicates two CORESET pool index values and two timing advance groups (TAGs). For example, a mDCI cell may indicate two CORESETPoolIndex values and two TAG indicators. A single-TRP cell configuration may indicate a single TAG indicator and/or a single CORESETPoolIndex value.

FIG. 3 illustrates a UL timing advance scheme 250 for the multi-TRP communication scenario 200 shown in FIG. 2, according to aspects of the present disclosure. As shown in FIG. 3, the first TRP 205*a* transmits a first DL signal 222, and the second TRP 205*b* transmits a second DL signal 224. The signals 222, 224 are shown with respect to a common reference transmit timing 220. It will be understood, however, that the signals 222, 224 may or may not be transmitted simultaneously. However, the signals 222, 224 are shown as temporally aligned relative to the transmit reference time 220 to illustrate aspects of UL timing advance in the scheme 250.

The first signal 222 is received by the UE 215 at a first reference time 226, which is associated with a propagation delay $T_{P1}$. The propagation delay $T_{P1}$ may be based on the physical distance between the first TRP 205*a* and the UE 215. To provide for time alignment of UL communications to the first TRP 205*a*, the UE 215 applies a timing advance $T_{TA1}$ to a UL communication 232. The timing advance may be associated with the propagation delay $T_{P1}$ and a timing advance offset. In some aspects, the timing advance $T_{TA1}$ may be based on one or more indicated timing advance parameters of a timing advance command. For example, the timing advance command may be transmitted via a RACH message (e.g., random access response), via a MAC-CE in DL shared channel communication, and/or by any other suitable communication. The timing advance command by be carried in a timing advance command MAC control element. The element may indicate a timing advance group (TAG) indicator and the timing advance command associated with the TAG indicator. The timing advance command for a TAG may indicate an adjustment of a current timing advance value to a new timing advance value. The adjustment may be indicated by an integer value between 0 and 63, for example. The integer value may be used to determine the timing advance in absolute units of time (e.g., μs)

If the UE 215 is configured to communicate with multiple TRPs 205 on a same serving cell, the serving cell may be configured with multiple TAGs to facilitate different timing advances for communications to each of the TRPs 205*a*, 205*b* on the serving cell. In some instances, the UE 215 may also be configured with one or more cells (e.g., SCells) that are configured with a single TAG and a single CORESET pool index. For example a SpCell may be configured with a first CORESET pool associated with a first CORESET pool index and a second CORESET pool associated with a second CORESET pool index. Each CORESET pool may refer to a periodic set of time/frequency resources for which the UE may perform blind decoding operations to attempt to decode DL control information. Accordingly, the UE may monitor for DL control information on the SpCell based on both the first CORESET pool and the second CORESET pool. Another cell configuration, such as an SCell configuration, may indicate only a single CORESET pool associated with a single CORESET pool index for monitoring for the DL configuration.

Figure 4:
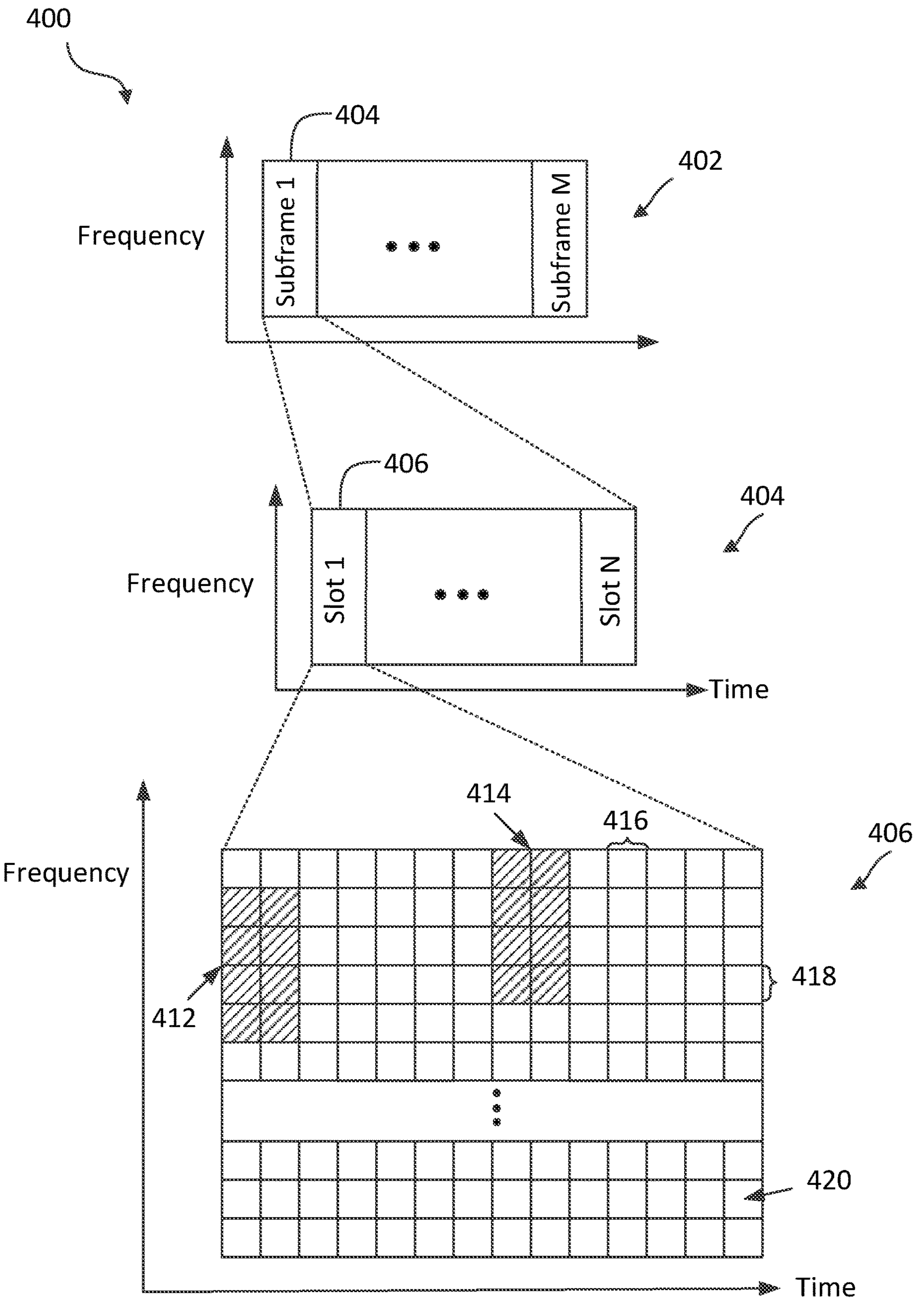
FIG. 4 illustrates a transmission frame for a communication network according to some embodiments of the present disclosure.

FIG. 4 is a timing diagram illustrating a transmission frame structure 400 according to some embodiments of the present disclosure. The transmission frame structure 400 may be employed by BSs such as the BSs 105 and UEs such as the UEs 115 in a network such as the network 100 for communications. In particular, the BS may communicate with the UE using time-frequency resources configured as shown in the transmission frame structure 400. In FIG. 4, the x-axes represent time in some arbitrary units and the y-axes represent frequency in some arbitrary units. The transmission frame structure 400 includes a radio frame 402. The duration of the radio frame 402 may vary depending on the embodiments. In an example, the radio frame 402 may have a duration of about ten milliseconds. The radio frame 402 includes M number of subframes 404, where M may be any suitable positive integer. In an example, M may be about 10.

Each subframe 404 may contain N slots 406, where N is any suitable positive number including 1. Each slot 406 includes a number of subcarriers 418 in frequency and a number of symbols 416 in time. The number of subcarriers 418 and/or the number of symbols 416 in a slot 406 may vary depending on the embodiments, for example, based on the channel bandwidth, the subcarrier spacing (SCS), and/or the cyclic prefix (CP) mode. One subcarrier 418 in frequency and one symbol 416 in time forms one resource element (RE) 420 for transmission.

A BS (e.g., BS 105 in FIG. 1) may schedule a UE (e.g., UE 115 in FIG. 1) for UL and/or DL communications at a time-granularity of slots 406. A BS 105 may schedule a UE 115 to monitor for PDCCH transmissions by instantiating a search space associated with a CORESET 412. The search space may also be instantiated with associated CORESET 414. Thus, as illustrated in the example of FIG. 4, there are two CORESETs, and therefore two monitoring occasions, within the slot 406 that are part of the search space the UE 115 monitors for control information from the BS 105.

While FIG. 4 illustrates two CORESETs, 412 and 414, for purposes of simplicity of illustration and discussion, it will be recognized that embodiments of the present disclosure may scale to many more CORESETs, for example, about 3, 4 or more. Each CORESET may include a set of resources spanning a certain number of subcarriers 418 and a number of symbols 416 (e.g., about 1, 2, or 3) within a slot 406. As an alternative to multiple different CORESETs within a slot 406, one or more of the many CORESETs may be in a different slot than the others. Each CORESET has an associated control channel element (CCE) to resource element group (REG) mapping. A REG may include a group of REs 420. The CCE defines how DL control channel data may be transmitted.

A BS 105 may configure a UE 115 with one or more search spaces by associating a CORESET 412 with a starting position (e.g., a starting slot 406), a symbol 416 location within a slot 406, a periodicity or a time pattern, and candidate mapping rules. For examples, a search space may include a set of candidates mapped to CCEs with aggregation levels of 1, 4, 4, 8, and/or 12 CCEs. As an example, a search space may include the CORESET 412 starting at the first symbol 416 indexed within a starting slot 406. The search space may also include the CORESET 414 starting at a later symbol index within the starting slot 406. The exemplary search space may have a periodicity of about five slots and may have candidates at aggregation levels of 1, 4, 4, and/or 8.

The UE 115 may perform blind decoding in the search spaces to search for DL control information (e.g., slot format information and/or scheduling information) from the BS. In some examples, the UE may search a subset of the search spaces based on certain rules, for example, associated with the UE's channel estimation and/or blind decoding capabilities. One such example of DL control information the UE 115 may be blind decoding for is a PDCCH from the BS 105.

As shown in FIG. 4, CORESET 412 and CORESET 414 may be at different frequencies from each other. The CORESETs can be non-contiguous as shown, or they may be contiguous. The frequency ranges of CORESET 412 and CORESET 414 may overlap or not (e.g., as illustrated in FIG. 4, the frequency ranges partially overlap, and therefore are different from each other). In some aspects, the frequency offset between the CORESETs is a multiple of six RBs, or some other offset. According to the example of FIG. 4, each of CORESET 412 and CORESET 414 may carry a different PDCCH transmission (or none at all, though part of the search space for the UE 115). CORESET 412 and CORESET 414 can have other characteristics which are different from each other than just frequency (or instead of frequency). For example, they can differ in CCE-to-REG mapping and/or REG bundling. Or, they can also be associated with different TCI states, thereby being associated with different beams. In addition, the CCE index of a PDCCH monitoring occasion may be different across CORESETs. Other forms of diversity between CORESETs could be achieved as well, including some combination of differing characteristics (such as all of the above differences together or a subset thereof).

By adding diversity between the CORESETs, problems with transmission channels associated with those features may be mitigated. FIG. 4 shows two different CORESETs, but there may be more than two CORESETs, each with either the same or different characteristics in any combination.

To determine a timing advance for UL communications in a carrier aggregation (CA) scenario, a reference cell may be selected, and a timing advance may be applied relative to DL signal timing on the reference cell. When a cell is configured for mDCI multi-TRP communications, UL signals on the cell may be transmitted to one of multiple TRPs. For example, the mDCI multi-TRP cell may be configured with multiple TAGs to allow for different timing advance commands to be applied to communications for either TRP. Further, the UE may be configured with other cells that are configured with a single TAG indicator and/or a single CORESET pool index. Accordingly, there may be multiple reference cell candidates in the CA multi-TRP communication scenario. However, not all cells may be configured with the same combinations of TAG indicators or CORESET pool index configurations. The present disclosure describes schemes and mechanisms for selecting reference cells and determining reference timings and timing advances for UL communications in a multi-TRP communication scenario.

Figure 5:
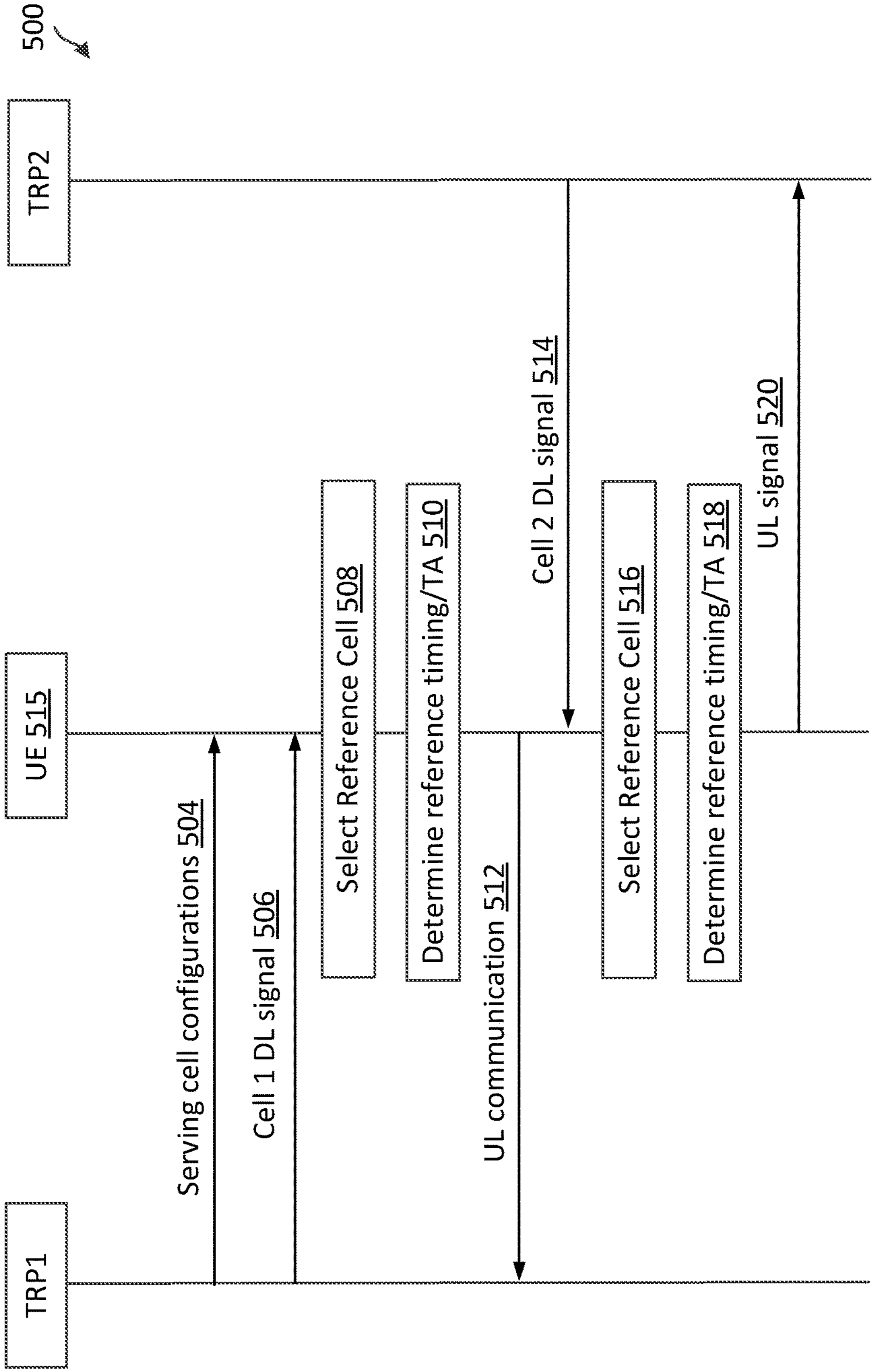
FIG. 5 is a signaling diagram of a multiple transmission-reception point (multi-TRP) communication method according to some aspects of the present disclosure.

FIG. 5 is a signaling diagram illustrating a multi-TRP communication method 500 according to some aspects of the present disclosure. The method 500 is employed by a first TRP (TRP1), a second TRP (TRP2), and a UE 515. In some aspects, one or both of the TRPs may be one of the BSs 105 in the network 100. In other aspects, one or both of the TRPs 501, 503 may be another type of wireless node or connection point. In some aspects, the UE 515 may be one of the UEs 115 of the network 100. The UE 515 may be configured for multi-TRP communications with both TRP1 and TRP2. However, it will be understood that the UE 515 may be configured for multi-TRP communications with more than two TRPs, including three, four, five, six, and/or any other suitable number of TRPs. Further, the UE 515 may be configured for carrier aggregation (CA) using a plurality of serving cells to communicate with the network. In some aspects, the UE 515 may be configured to communicate with both TRPs on a first cell, but not a second cell. In other aspects, the UE 515 may be configured for multi-TRP communications with TRP1 and TRP2 using two or more cells.

As explained above, the UE 515 may be configured for single-DCI multi-TRP communications, or multi-DCI (mDCI) multi-TRP communications. In mDCI multi-TRP communications, the UE 515 may receive scheduling DCI from either of TRP1 or TRP2 for DL and/or UL communications communicated with the corresponding TRP. Accordingly, TRP1 may transmit DCI to the UE 515 to schedule communications for TRP1, and TRP2 may transmit DCI to the UE 515 to schedule communications for TRP2. In some aspects, the method 500 may be performed in a mDCI multi-TRP communication scenario. In some aspects, the method 500 involves the UE selecting a reference cell and determining a reference timing for UL communications in the multi-TRP scenario. In this regard, the UE 515 may be scheduled to transmit UL communications to one of multiple TRPs on one of a plurality of cells. However, some of the cells may not be configured for mDCI multi-TRP. For example, at least one of the cells may not be configured with two CORESET pool index values and two TAGs, while another cell is configured with two CORESET pool index values and two TAGs. To determine a timing advance appropriate for the receiving TRP for a UL communication on a cell, the UE first selects at least one reference cell, and determines at least one reference timing based on the at least one reference cell.

At action 504, TRP1 transmits, and the UE 515 receives one or more serving cell configurations for the one or more serving cells including one or more DL control channel configurations associated with the one or more serving cells and TAG configurations associated with the one or more serving cells. In some aspects, each of the serving cells may be associated with a frequency band, such as a component carrier (CC) and/or a bandwidth part (BWP). The UE 515 may be configured for carrier aggregation (CA), by which the UE 515 can communicate with TRP1 and TRP2 using two or more serving cells. The serving cells may include, for example, a primary cell (PCell), one or more secondary cells (SCells), a PUCCH secondary cell (PSCell), and/or a special cell (SpCell). In some aspects, action 504 includes receiving a DL control channel configuration for each cell of the two or more cells. In some aspects, the UE 515 receives a DL control channel configuration and TAG configuration for the at least of the plurality of cells, where the DL control channel configuration indicates, for the at least one cell, two CORESET pool index values, and the TAG configuration indicates, for the at least one cell, two TAG indicators. In some aspects, the DL control channel configuration and the TAG configuration may indicate a first CORESET pool index value and a first TAG indicator, and a second CORESET pool index value and a second TAG indicator. In some aspects, action 504 includes receiving one or more CORESET pool index values and/or TAG indicators for each other serving cell on which the UE is configured to communicate.

Each TAG indicator may be associated with a TA configuration received from one of the TRPs. For example, the method 500 may further include the UE 515 receiving a TA configuration, which may be communicated in a random access message (e.g., random access response, MSG2, MSGB), and/or in a media access control control element (MAC-CE). The TA configuration may indicate a TAG indicator value, and a TA command associated with that TAG indicator value. The UE 515 may apply the TA command to all communications associated with the indicated TAG.

In some aspects, action 504 includes receiving one or more radio resource control (RRC) information elements (IEs) indicating one or more DL control channel configurations and one or more TAG configurations. The DL control channel configurations may also include or indicate one or more CORESET pool index values. The TAG configuration may indicate one or more TAG indicators. For example, the DL control channel configurations may indicate one or more CORESETPoolIndex values, where each CORESETPoolIndex value is associated with a TAG indicator. The TAG indicators and/or CORESET pool index values may be configured and/or indicated for each serving cell of the UE 515. In some aspects, more than one configured serving cell may be configured or associated with a same TAG indicator and/or a same CORESET pool index value.

As explained above, in some aspects, the method 500 may be employed in a multi-TRP communication scenario in which the UE 515 receives the plurality of TAG indicators from one or more TRPs over one or more serving cells. Although shown as being received from TRP1 only in FIG. 5, it will be understood that action 504 may include receiving DL control channel configurations from different TRPs, such as from TRP1 and from TRP2. For example, a first DL control channel configuration for a first cell may be transmitted by TRP1, and a second DL control channel configuration for a second cell may be transmitted by TRP2.

At action 506, TRP1 transmits, and the UE 515 receives, a DL signal. In some aspects, receiving the DL signal may include receiving a DL shared channel transmission, a DL control channel transmission, a reference signal, a synchronization signal block (SSB), and or any other suitable type of DL signal. For example, action 506 may include TRP1 transmitting, on the first cell, a PDSCH transmission carrying DL data. In other aspects, action 506 may include TRP1 transmitting, on a first cell, a DCI scheduling a UL communication. The DL signal may correspond to a DL timing. For example, the DL signal may include DCI scheduling a UL communication based on the DL timing as received by the UE 515. Accordingly, the DL signal may be received by the UE 515 following a propagation delay associated with the distance between the UE 515 and TRP1. To compensate for the propagation delay and to facilitate suitable orthogonality of UL communications received at TRP1, the UE 515 determines a timing advance based on a TA configuration for a TAG indicator associated with TRP1, and a DL reference timing determined based on the received DL signal.

Figure 6A:
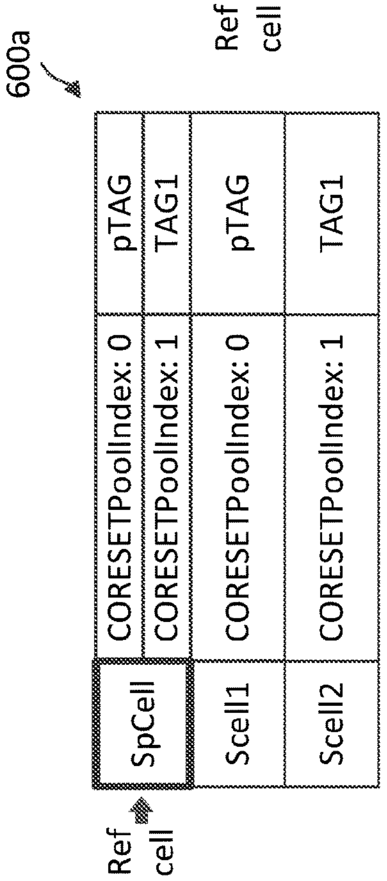
FIG. 6A is a diagram illustrating a scheme for selecting a reference cell in a multi-TRP communication scenario according to some aspects of the present disclosure.
Figure 6B:
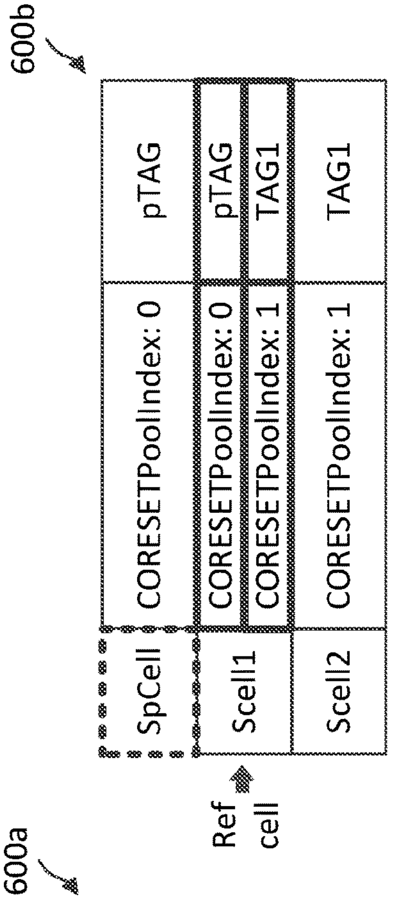
FIG. 6B is a diagram illustrating a scheme for selecting a reference cell in a multi-TRP communication scenario according to some aspects of the present disclosure.
Figure 6C:
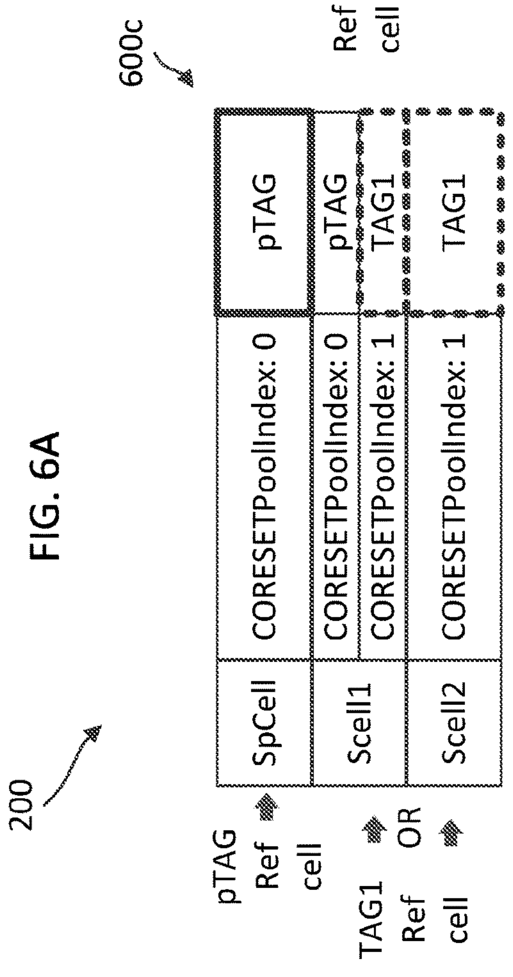
FIG. 6C is a diagram illustrating a scheme for selecting a first reference cell and a second reference cell in a multi-TRP communication scenario according to some aspects of the present disclosure.

At action 508, the UE 515 selects a first reference cell for determining a first reference timing for a scheduled UL communication. In some aspects, a same reference cell may be determined or selected to determine timing advances for multiple cells, TAGs, and/or TRPs. In other aspects, a single reference cell is selected to determining timing advances for communications associated with all serving cells, associated TAGs, and/or TRPs in the communication scenario. In some aspects, the UE 515 may select a first reference cell for determining the first reference timing based on a number of TAG indicators and/or a number of CORESET pool index values associated with at least one of the plurality of serving cells. For example, the UE 515 may select the first reference cell based on whether a cell is configured with two TAG indicators and/or whether the cell is configured with two CORESET pool index values. For example, the UE 515 may select the first reference cell based on the reference cell being configured with two TAG indicators, and/or based on the first reference cell being configured with two CORESETPoolIndex values. In another aspect, the UE 515 may select the first reference cell based on whether a special cell (SpCell) configured for the UE is configured with two TAG indicators and/or two CORESET pool index values. Various aspects for determining and/or selecting one or more reference cells, including the first reference cell are shown in FIGS. 6A-6E and described below. FIGS. 6A-6E illustrate schemes 600*a*-600*e* for selecting one or more reference cells based on serving cell configurations for each of a plurality of serving cells of the UE 515. The serving cell configurations indicate, for each serving cell, at least one CORESETPoolIndex value and at least one TAG indicator. The configured cells may include a SpCell and/or one or more SCells. In FIGS. 6A-6B, bold boxes may indicate the relevant parameter(s) of the serving cell configuration for selecting the reference cell. Dashed boxes may indicate optional, alternative, and/or default reference cell selection parameters. For example, with reference to FIG. 6B, the dashed box may indicate a default conditional reference cell selection configuration whereby the SpCell is selected as the reference cell if one or more criteria are met, as explained below. With reference to FIGS. 6C and 6E, the dashed boxes may indicate alternate candidates for reference cells which may be selected based on UE or BS implementation. For example, the UE and/or BS may select either Scell 1 or Scell 2 as a reference cell based on a preconfigured rule (e.g., higher cell index, lower cell index, etc.)

Referring to FIGS. 5 and 6A, in some aspects, action 508 includes the UE 515 selecting an SpCell as the first reference cell. FIG. 6A illustrates a scheme 600*a* for selecting, based on a serving cell configuration, an SpCell as the first reference cell. For example, the network may be configured to determine and transmit timing advance commands and configurations based on SpCell timing. In some aspects, the network may configure the SpCell with two TAG indicators and/or two CORESET pool index values. Accordingly, the UE 515 may assume or expect the SpCell to include two TAG indicators and/or two CORESET pool index values. Accordingly, the UE selects the SpCell as the reference cell. Thus, the UE 515 may determine the reference timing based on DL communications received from one or more TRPs based on the timing of DL signals received on the SpCell.

Referring to FIGS. 5 and 6B, in some aspects, action 508 includes the UE 515 selecting an SpCell as the first reference cell if the SpCell is configured with two TAG indicators and/or with two CORESET pool index values. As shown in the scheme 600*b* of FIG. 6B, if the SpCell is not configured with two TAG indicators and/or two CORESET pool index values, the UE 515 may select the first reference cell from one or more SCells based on first reference cell being configured with two TAG indicators and/or with two CORESET pool index values. Accordingly, in the example of FIG. 6B, the UE 515 selects SCell 1 as the reference cell, where SCell 1 is configured with two TAG indicators and two CORESETPoolIndex values. Thus, the UE 515 may determine the reference timing based on DL communications received from one or more TRPs based on the timing of DL signals received on SCell 1.

Referring to FIGS. 5 and 6C, in some aspects, action 508 includes the UE 515 selecting separate reference cells for each TAG. For example, as shown in the scheme 600*c* of FIG. 6C, the SpCell may be selected as a reference cell for communications associated with the pTAG. For 0, the UE 515 may select any one of the SCells configured with TAG1 as the TAG1 reference cell. If more than one SCell is configured with TAG1, the UE 515 may select the first reference cell based on frequency (e.g., highest frequency configured with TAG1, lowest frequency configured with TAG1, etc.), cell index, or any other suitable parameter. In some aspects, the default TAG1 reference cell may be the SCell that includes more than one configured CORESET-PoolIndex value and/or more than one configured TAG index. In the example of FIG. 6C, the UE 515 selects SCell 1 as the reference cell for TAG1, where SCell 1 is configured with two TAG indicators and two CORESETPoolIndex values. However, in other examples, the UE 515 may be configured to select SCell2 as the TAG1 reference cell. In some aspects, TAG1 may be an sTAG.

Figure 6D:
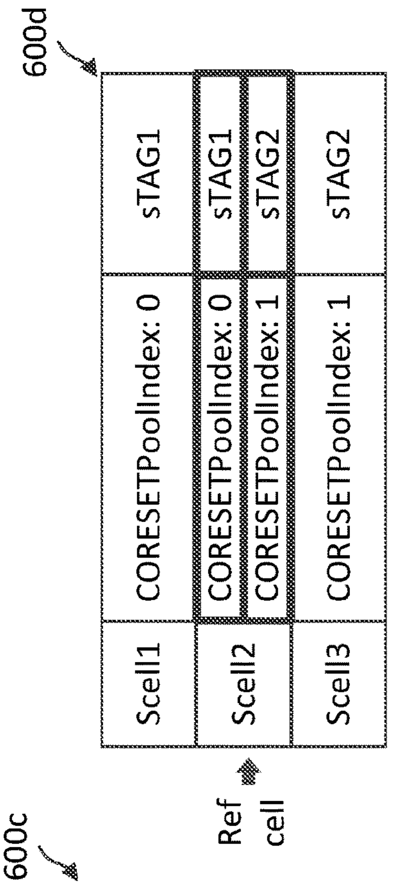
FIG. 6D is a diagram illustrating a scheme for selecting a reference cell in a multi-TRP communication scenario according to some aspects of the present disclosure.
Figure 6E:
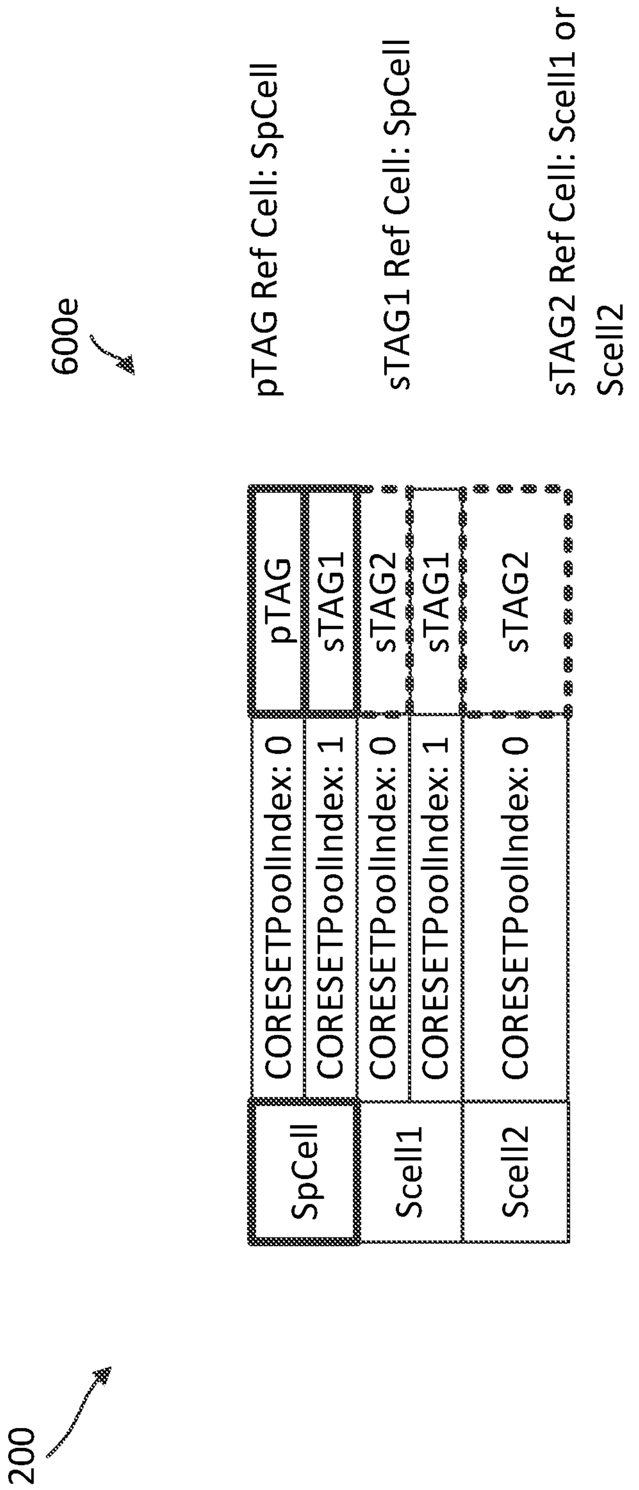
FIG. 6E is a diagram illustrating a scheme for selecting a plurality of reference cells in a multi-TRP communication scenario according to some aspects of the present disclosure.

Referring to FIGS. 5 and 6D, in some aspects, none of the serving cells configured for multi-TRP communications may be configured with a pTAG. FIG. 6D illustrates a scheme 600*d* for selecting a first reference cell from a plurality of configured SCells based on at least one of the SCells being configured with two CORESETPoolIndex values and/or two TAG indicators. For example, none of the serving cells configured for multi-TRP communications may be an SpCell. In some aspects, action 508 may include the UE 515 selecting, from a plurality of serving SCells, an SCell configured with two TAG indicators and/or two CORESET-PoolIndex values. Accordingly, FIG. 6D shows the UE 515 selecting SCell 1 as the reference cell, where SCell 1 is configured with two TAG indicators and two CORESET-PoolIndex values. Thus, the UE 515 may determine the reference timing based on DL communications received from one or more TRPs based on the timing of DL signals received on SCell 1. In some aspects, if more than one SCell is configured with two TAG indicators and/or two CORE-SETPoolIndex values, the UE 515 may select the first reference cell based on frequency, cell index, or any other suitable parameter.

Referring to FIGS. 5 and 6E, in some aspects, action 508 includes the UE 515 selecting a reference cell for each of the configured TAGs across the serving cells. In this regard, the scheme 600 of FIG. 6E illustrates a selection of the SpCell as the reference cell for pTAG (e.g., first reference cell), the SpCell as the reference cell for sTAG1, and one of SCell 1 or SCell2 as the reference cell for sTAG2. For example, the UE 515 may be configured to select the SpCell as the reference cell for all TAG indicators associated with the SpCell. For each remaining sTAG, the UE 515 may be configured to select any SCell configured with that TAG indicator as the reference cell. Accordingly, in the example shown in FIG. 6E, the UE 515 may select either SCell 1 or SCell2 as the reference cell for sTAG2, as both SCell 1 and SCell2 are configured with sTAG2. In some aspects, if more than one SCell is configured with sTAG2, the UE 515 may select the reference cell for sTAG2 based on frequency, cell index, or any other suitable parameter.

Returning to the method 500 of FIG. 5, at action 510, the UE 515 determines, based on the first reference cell, and/or any other reference cell selected at action 508, a reference timing and timing advance for a cell 1 communication. For example, the reference timing may be determined based on a timing of a DL signal received on the corresponding reference cell. If the UE 515 receives a DCI on the reference cell at action 506 scheduling a UL communication, the UE 515 may determine the reference time based on the timing of the receipt of the DCI. Accordingly, the UE 515 may determine the time for transmitting the scheduled UL communication based on the DL timing of the reference cell, and a timing advance command associated with the reference cell. However, as explained above, one or more of the reference cells selected at action 508 may be associated with more than one TAG, and the DL signal may be transmitted from one of multiple TRPs. Accordingly, the present disclosure describes schemes and mechanisms for determining one or more reference timings based on the one or more reference cells selected at action 508. FIGS. 7A-7D illustrate schemes for determining reference timing and timing advance based on the reference sell selection at action 508.

Figure 7B:
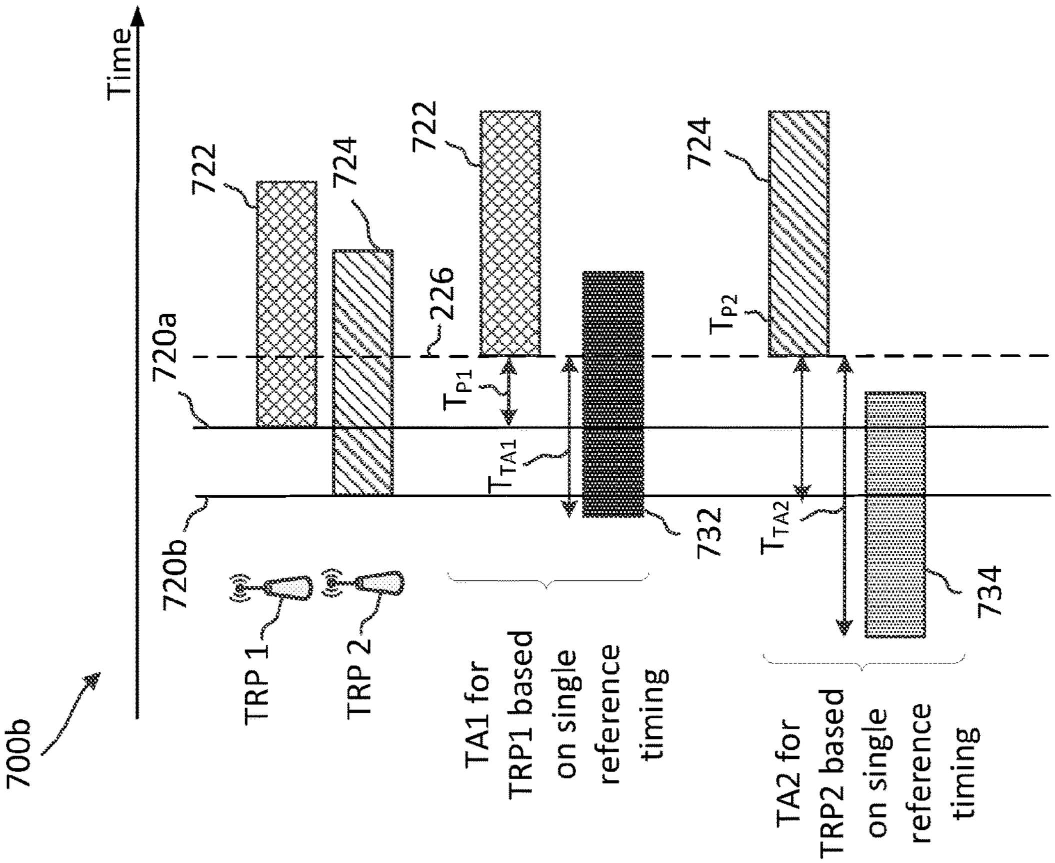
FIG. 7B is a timing diagram for determining timing advances in a multi-TRP communication scenario according to some aspects of the present disclosure.
Figure 7A:
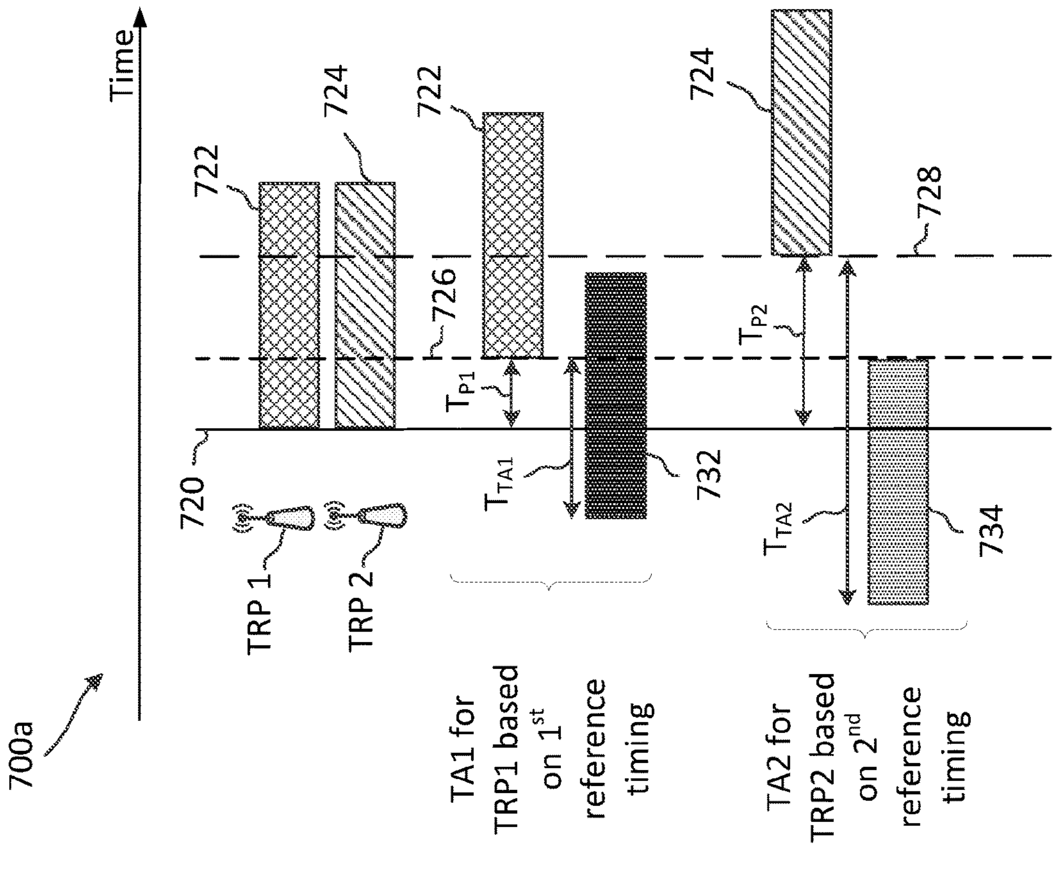
FIG. 7A is a timing diagram for determining timing advances in a multi-TRP communication scenario according to some aspects of the present disclosure.

Referring to FIGS. 5 and 7A, in some aspects, the UE 515 may determine separate reference timings for a reference cell associated with two CORESET pool index values and/or two TAG indicators. In this regard, FIG. 7A illustrates a scheme 700*a* in which a first TRP (TRP1) transmits a first DL signal 722, and a second TRP (TRP2) transmits a second DL signal 724. Further, each DL signal 722, 724 may be associated with a CORESET pool index value, which may be based on the transmitting TRP. The first and second DL signals 722, 724 may include any suitable DL signals and/or DL communications, including DCI, DL data, RRC configurations, DL reference signals, and/or any other suitable signal. The first and second DL signals 722, 724 are shown as being aligned in time with respect to a same transmit reference timing 720. However, it will be understood that the DL signals may not be transmitted simultaneously, in some aspects. The UE 515 may determine a first reference timing 726 for a first TAG indicator based on the first detected path (in time) of the first DL signal 722 associated with the first CORESET pool index, where the first reference timing is associated with a first propagation delay $T_{P1}$. The UE 515 may apply a timing advance $T_{TA1}$ to a first UL communication 732 for the respective TAG indicator of the DL signal 722 based on the first reference timing 726. The UE 515 may also determine a second reference timing 728 for a second TAG indicator based on the first detected path (in time) of the second DL signal 724 associated with the second CORE-SET pool index, where the second reference timing is associated with a second propagation delay $T_{P2}$. The UE 515 may apply a timing advance $T_{TA2}$ to a second UL communication 734 for the respective TAG indicator of the DL signal 724 based on the second reference timing 728.

Referring to FIGS. 5 and 7B, in another example, the UE 515 may determine a single reference timing for a reference cell. The single reference timing may be used for UL signals corresponding to different TAGs. In this regard, FIG. 7B illustrates TRP1 transmitting a first DL signal 722, and a TRP2 transmitting a second DL signal 724. The first and second DL signals 722, 724 are shown as being transmitted at different transmit times 720*a*, 720*b*. Further, each DL signal 722, 724 may be associated with a CORESET pool index value, which may be based on the transmitting TRP. The first and second DL signals 722, 724 may include any suitable DL signals and/or DL communications, including DCI, DL data, RRC configurations, DL reference signals, and/or any other suitable signal. The UE 515 may determine the single reference timing 726 for both TAGs based on the first detected path (in time) of the first DL signal 722 associated with the first CORSET pool index, where the first reference timing is associated with a first propagation delay $T_{P1}$. For example, the first DL signal 722 may be associated with a CORESETPoolIndex value of 0, and the UE 515 may determine the reference timing 726 based on the first detected path (in time) of a DL signal associated with CORESETPoolIndex value 0. The UE 515 may apply, for a first UL communication 732, a timing advance $T_{TA1}$ for the respective TAG indicator (e.g., first TAG indicator) based on the first reference timing 726. The UE 515 may also apply, for a second UL communication 734, a timing advance $T_{TA2}$ for the respective TAG indicator (e.g., second TAG indicator) based on the first reference timing 726. In this regard, the network may configure the timing commands (including timing advance values) for each TAG with reference to the first reference timing 726.

Figure 7C:
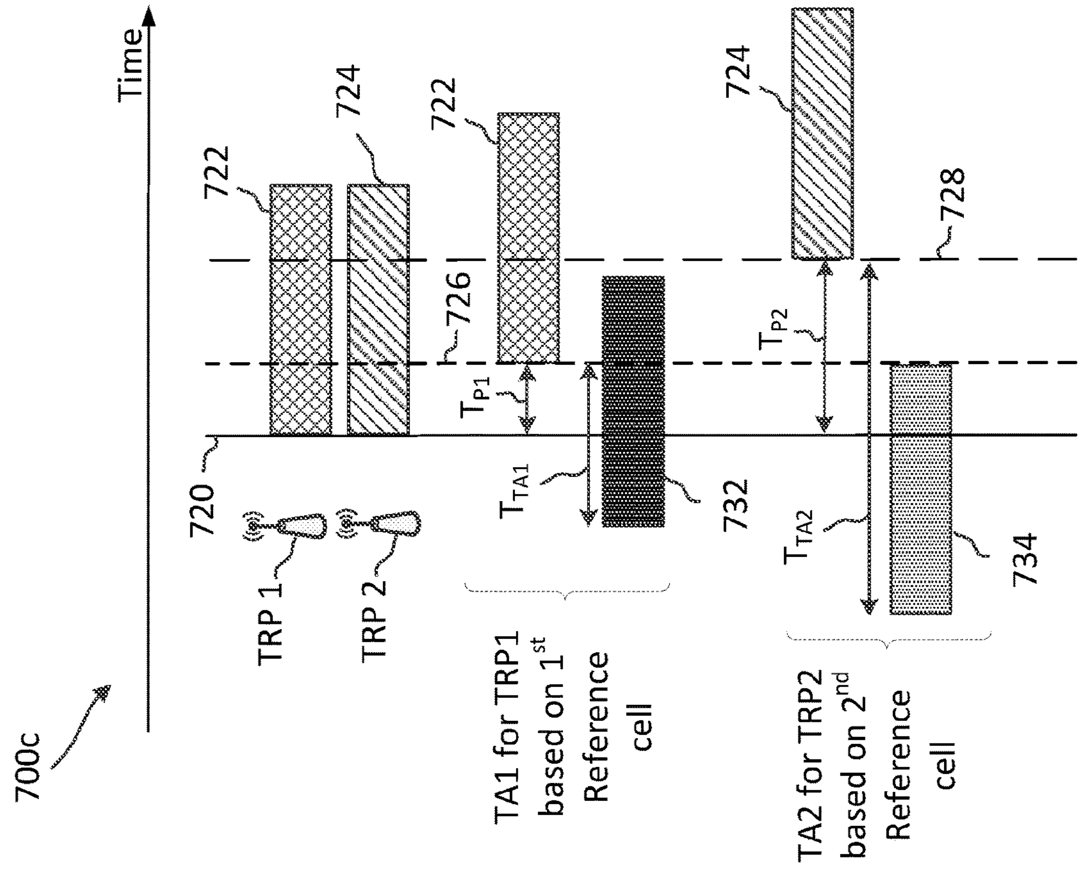
FIG. 7C is a timing diagram for determining timing advances in a multi-TRP communication scenario according to some aspects of the present disclosure.

Referring to FIGS. 5 and 7C, in another example, the UE 515 may determine a single reference timing for each of a plurality of reference cells. In some aspects, if the UE 515 determines more than one reference cell, as illustrated in FIG. 6C for example. The UE 515 may determine a single reference timing for each reference cell. The single reference timing may be used for UL signals corresponding to TAG indicators of each of the different reference cells. In this regard, FIG. 7C illustrates TRP1 transmitting a first DL signal 722 on cell 1, and a TRP2 transmitting a second DL signal 724 on cell 2. The first and second DL signals 722, 724 are shown as being aligned in time with respect to a same transmit reference timing 720. However, it will be understood that the DL signals may not be transmitted simultaneously, in some aspects. The first and second DL signals 722, 724 may include any suitable DL signals and/or DL communications, including DCI, DL data, RRC configurations, DL reference signals, and/or any other suitable signal. The UE 515 may determine the first reference timing 726 for the first reference cell based on the first detected path (in time) of the first DL signal 722 associated with a CORESET pool index corresponding to the first cell (cell 1), where the first reference timing is associated with a first propagation delay $T_{P1}$. The UE 515 may determine the second reference timing 728 for the second reference cell based on the first detected path (in time) of the second DL signal 724 associated with a CORESET pool index (different from the CORESET pool index of the first cell) corresponding to the second cell (cell 2), where the second reference timing is associated with a first propagation delay $T_{P2}$. The UE 515 may apply, for a first UL communication 732, a timing advance $T_{TA1}$ based on the first reference timing 726 for cell 1. The UE 515 may also apply, for a second UL communication 734, a timing advance $T_{TA2}$ based on the second reference timing 728 for cell 2.

Figure 7D:
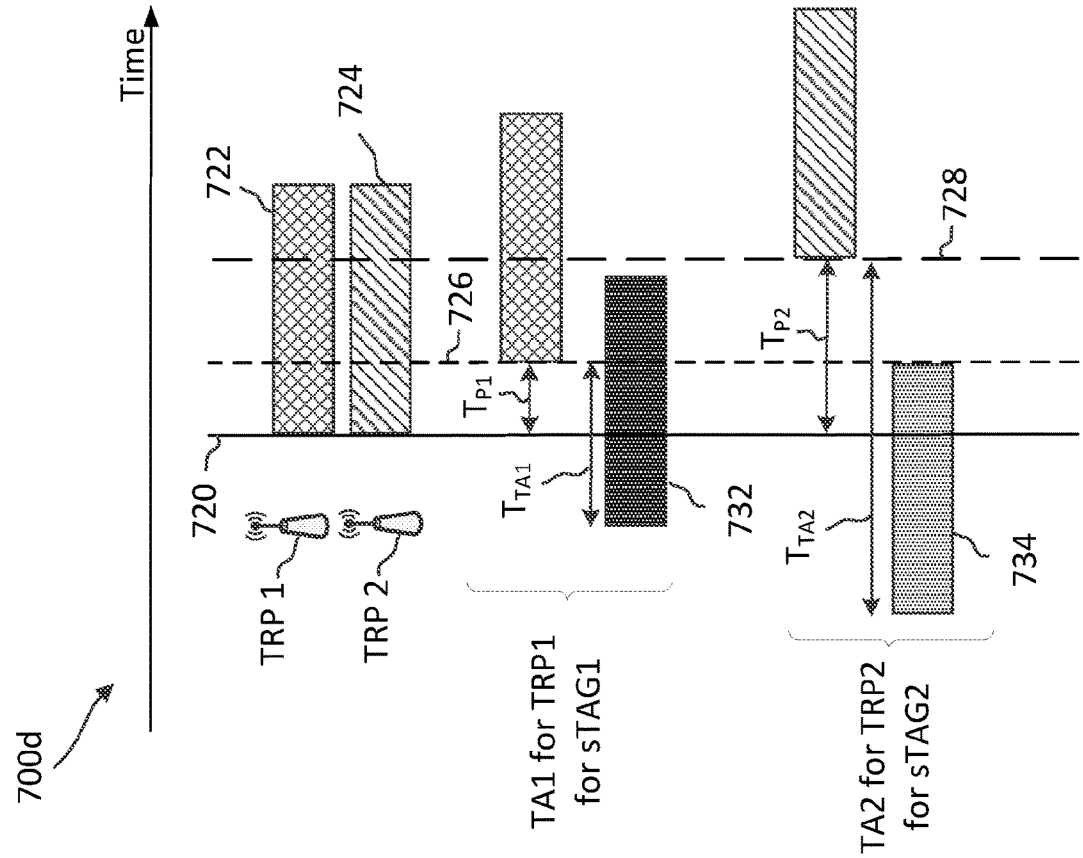
FIG. 7D is a timing diagram for determining timing advances in a multi-TRP communication scenario according to some aspects of the present disclosure.

Referring to FIGS. 5 and 7D, in another example, the UE 515 may determine a reference timing for each TAG in the multi-TRP communication scenario. In some aspects, if the UE 515 determines a reference cell for each TAG, as illustrated in FIG. 6D for example. The UE 515 may determine a reference timing for each TAG-based reference cell. The reference timing may be used for UL signals corresponding to each of the TAGs. In this regard, FIG. 7D illustrates TRP1 transmitting a first DL signal 722 associated with a first CORESET pool index, the first CORESET pool index is associated with a first sTAG (sTAG1) and a TRP2 transmitting a second DL signal 724 associated with a second CORESET pool index, the second CORESET pool index is associated with a second sTAG (sTAG2). The first and second DL signals 722, 724 are shown as being aligned in time with respect to a same transmit reference timing 720. However, it will be understood that the DL signals may not be transmitted simultaneously, in some aspects. The first and second DL signals 722, 724 may include any suitable DL signals and/or DL communications, including DCI, DL data, RRC configurations, DL reference signals, and/or any other suitable signal. The UE 515 may determine the first reference timing 726 for sTAG1 based on the first detected path (in time) of the first DL signal 722 corresponding to sTAG1, where the first reference timing is associated with a first propagation delay $T_{P1}$. The UE 515 may determine the second reference timing 728 for sTAG2 based on the first detected path (in time) of the second DL signal 722 corresponding to sTAG2, where the second reference timing is associated with a first propagation delay $T_{P2}$. The UE 515 may apply, for a first UL communication 732 associated with sTAG1, a timing advance $T_{TA1}$ based on the first reference timing 726 for sTAG1. The UE 515 may also apply, for a second UL communication 734 associated with sTAG2, a timing advance $T_{TA2}$ based on the second reference timing 728 for sTAG2.

Referring again to action 510 of the method 500, the UE 515 may also determine, for the UL communication, a timing advance based on the determined reference timing. Determining the timing advance may include applying a timing advance value and/or a timing advance offset indicated in a timing advance command associated with the DL signal transmitted at action 506.

At action 512, the UE 515 transmits, and TRP1 receives, a first UL communication based on the timing advance determined at action 510. In some aspects, the UE 515 may transmit the first UL communication on the first cell. In other aspects, the UE 515 may transmit the first UL communication on any other configured serving cell, such as a second cell, a third cell, a fourth cell, etc. For example, the UE 515 may transmit the first UL communication on a SPCell, a Pcell, an Scell, a PScell, or any other suitable type of cell. The timing advance applied to the UL communication may cause the UL communication to be received based on the timing of TRP1 for orthogonality of UL communications with other UEs. In some aspects, action 512 includes transmitting UL control information, UL data, and/or UL reference signals. For example, action 512 may include transmitting, to TRP1, UCI, UL data in a PUSCH, SRS, and/or any other suitable type of UL communication. In some aspects, transmitting the UL communication is based on a UL scheduling grant. For example, the DL signal transmitted at action 506 may include DCI indicating a scheduling grant for the UL communication. In some aspects, the UL scheduling grant may be based on a scheduling request transmitted by the UE 515. For example, the scheduling request may be transmitted as part of a RACH procedure (e.g., RACH MSG3). In another example, the scheduling request may be transmitted in a PUCCH.

At action 514, TRP2 transmits, and the UE 515 receives, a second DL signal on a second cell (cell 2). In some aspects, TRP2 may be in a different physical/geographical location than TRP1. Accordingly, the propagation delay, and therefore the timing advance, between the UE 515 and TRP2 may be different than the propagation delay/timing advance between the UE 515 and TRP1. Although the first DL signal in FIG. 5 is associated with cell 1 and the second DL signal is associated with cell 2, it will be understood that TRP1 and TRP2 may be configured to communicate respective DL signals using a same cell. For example, TRP2 may be configured to communicate with the UE 515 on one or more cells, component carriers, and/or bandwidth parts (BWPs) that are also configured for communication between the UE 515 and TRP1. In some aspects, communications between TRP2 and the UE 515 may be associated with a TAG and/or a CORESET pool index that is different from the TAG and/or CORESET pool index used for communications between TRP1 and the UE 515. In some aspects, receiving the second DL signal may include receiving a DL shared channel transmission, a DL control channel transmission, a reference signal, a synchronization signal block (SSB), and or any other suitable type of DL signal. For example, action 514 may include TRP2 transmitting, on the second cell, a PDSCH transmission carrying DL data. In other aspects, action 514 may include TRP2 transmitting, on the second cell, a DCI scheduling a UL communication. The second DL signal may correspond to a DL timing. For example, the second DL signal may include DCI scheduling a UL communication based on the DL timing as received by the UE 515. Accordingly, the second DL signal may be received by the UE 515 following a propagation delay associated with the distance between the UE 515 and TRP2. To compensate for the propagation delay and to facilitate suitable orthogonality of UL communications received at TRP2, the UE 515 determines a timing advance based on a TA configuration for a TAG indicator associated with TRP2, and a DL reference timing determined based on the received DL signal.

At action 516, the UE 515 selects a second reference cell for determining a second reference timing for a scheduled UL communication. The UE 515 may use the same techniques for selecting the second reference cell as described above with respect to action 508 and FIGS. 6A-6E, for example. Further, it will be understood that the UE 515 may use the same reference cell for determining a reference timing for the second UL signal, in some aspects. For example, a same reference cell may be determined or selected to determine timing advances for communications from cells 1 and 2, different TAGs, and/or different TRPs (e.g., TRP1, TRP2, etc.). In other aspects, a single reference cell is selected to determining timing advances for communications associated with all serving cells, associated TAGs, and/or TRPs in the communication scenario.

At action 518, the UE 515 determines, based on the reference cell selected at action 516, a second reference timing and second timing advance for at least one UL communication for transmission to TRP2. In some aspects, the UE 515 and/or TRP2 may use the same techniques described above with respect to action 510 and FIGS. 7A-7D to determine the second reference timing and/or the second timing advance.

At action 520, the UE 515 transmits, and TRP2 receives, a second UL communication based on the reference timing determined at action 518. In some aspects, the UE 515 may transmit the second UL communication on the second cell. In other aspects, the UE 515 may transmit the second UL communication on any other configured serving cell, such as the first cell, a third cell, a fourth cell, etc. For example, the UE 515 may transmit the second UL communication on a SPCell, a Pcell, an Scell, a PScell, or any other suitable type of cell. In some aspects, the timing advance applied to the second UL communication may cause the UL communication to be received based on the timing of TRP2 for orthogonality of UL communications with other UEs. In some aspects, action 520 includes transmitting UL control information, UL data, and/or UL reference signals. For example, action 520 may include transmitting, to TRP2, UCI, UL data in a PUSCH, SRS, and/or any other suitable type of UL communication. In some aspects, transmitting the UL communication is based on a UL scheduling grant. For example, the DL signal transmitted at action 514, or at action 506, may include DCI indicating a scheduling grant for the UL communication. In some aspects, the UL scheduling grant may be based on a scheduling request transmitted by the UE 515. For example, the scheduling request may be transmitted as part of a RACH procedure (e.g., RACH MSG3). In another example, the scheduling request may be transmitted in a PUCCH.

Figure 8:
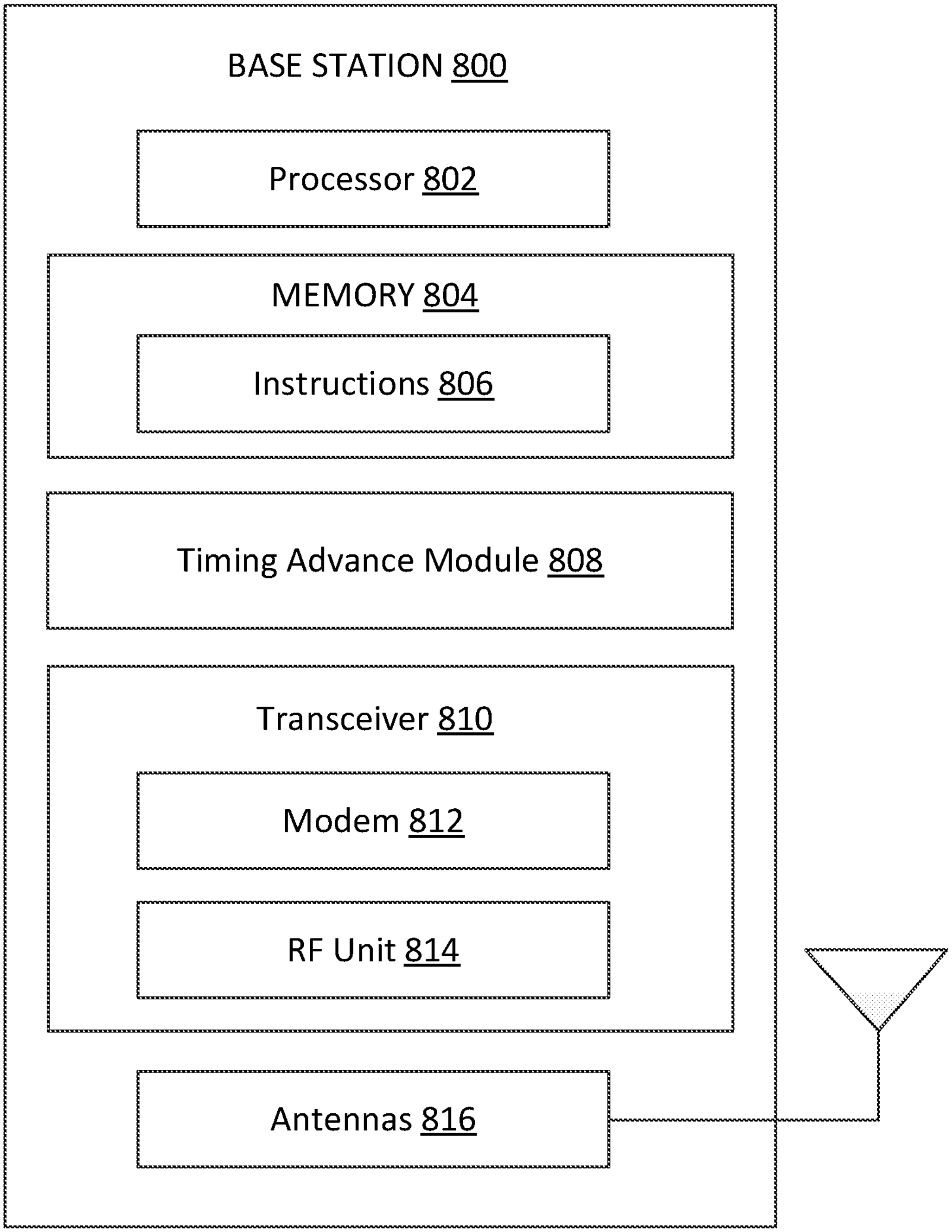
FIG. 8 illustrates a block diagram of a base station (BS) according to some aspects of the present disclosure.

FIG. 8 is a block diagram of an exemplary BS 800 according to some aspects of the present disclosure. The BS 800 may be a BS 105 as discussed in FIG. 1, and or a TRP as discussed in FIGS. 2 and 5. For example, the BS 800 may be configured as one of multiple TRPs in a network configured for communication with at least one UE, such as one of the UEs 115, 215, 515, and/or 900. As shown, the BS 800 may include a processor 802, a memory 804, a timing advance module 808, a transceiver 810 including a modem subsystem 812 and a RF unit 814, and one or more antennas 816. These elements may be coupled with one another. The term “coupled” may refer to directly or indirectly coupled or connected to one or more intervening elements. For instance, these elements may be in direct or indirect communication with each other, for example via one or more buses.

The processor 802 may have various features as a specific-type processor. For example, these may include a CPU, a DSP, an ASIC, a controller, a FPGA device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 804 may include a non-transitory computer-readable medium. The memory 804 may store instructions 806. The instructions 806 may include instructions that, when executed by the processor 802, cause the processor 802 to perform operations described herein, for example, aspects of FIGS. 5-7D. Instructions 806 may also be referred to as program code. The program code may be for causing a wireless communication device to perform these operations, for example by causing one or more processors (such as processor 802) to control or command the wireless communication device to do so. The terms “instructions” and “code” should be interpreted broadly to include any type of computer-readable statement(s). For example, the terms “instructions” and “code” may refer to one or more programs, routines, sub-routines, functions, procedures, etc. “Instructions” and “code” may include a single computer-readable statement or many computer-readable statements.

The timing advance module 808 may be implemented via hardware, software, or combinations thereof. For example, the timing advance module 808 may be implemented as a processor, circuit, and/or instructions 806 stored in the memory 804 and executed by the processor 802. In some examples, the timing advance module 808 can be integrated within the modem subsystem 812. For example, the timing advance module 808 can be implemented by a combination of software components (e.g., executed by a DSP or a general processor) and hardware components (e.g., logic gates and circuitry) within the modem subsystem 812. The timing advance module 808 may communicate with one or more components of BS 800 to implement various aspects of the present disclosure, for example, aspects of FIGS. 5-7D.

In some aspects, the timing advance module 808 is configured to transmit, to a UE (e.g., UE 115, 215, 515, 900), a timing advance configuration. In some aspects, transmitting the timing advance configuration may include transmitting a RRC configuration including one or more RRC parameters. The one or more RRC parameters may indicate a timing advance group (TAG) indicator and a timing advance command. In another aspect, the timing advance module 808 is configured to transmit one or more DL control channel configurations, component carrier configurations, and/or bandwidth part (BWP) configurations. In some aspects, a component carrier configuration and/or a BWP configuration may be referred to as a cell configuration. The cell configurations may indicate, for each respective cell, one or more TAG indicators, and one or more CORESET pool index values. For example, the cell configurations may indicate at least one CORESETPoolIndex for each respective cell.

In some aspects, the timing advance module 808 may be configured for multi-TRP communications with at least one UE. Further, the timing advance module 808 may be configured to communicate with the at least one UE using a plurality of serving cells. The serving cells may include one or more of a primary cell (PCell), a secondary cell (SCell), a primary and secondary cell (PSCell), and/or a special cell (SpCell). Each cell may be associated with at least one TAG and at least one DL control channel monitoring group. In some aspects, at least one of the cells is configured for multi-DCI multi-TRP communications. For example, at least one cell may be configured with two CORESETPoolIndex values and two TAG indicators.

The timing advance module 808 may be configured to transmit, or cause the transceiver 810 to transmit, a DL signal on a first cell. The DL signal may include one or more of DCI, DL data, DL reference signals; paging messages, and/or any other suitable DL communication. The timing advance module 808 may be further configured to receive or obtain, from the UE, a UL communication based on at least one of the timing advance configurations and at least one of the cell configurations. In some aspects, the UL communication may be associated with a timing advance applied based on a reference cell. The reference cell may be the cell on which the DL signal was transmitted, in some aspects.

In some aspects, the timing advance configuration may include a timing advance value based on an expected reference cell timing. For example, the timing advance module 808 may be configured to indicate a timing advance command for a given TAG indicator, and to provide a cell configuration with a given TAG indicator, such that the UE can determine a suitable DL reference timing and apply a timing advance to the UL communication received by the timing advance module 808. In some aspects, the timing advance module 808 may determine the reference cell in accordance with the schemes and mechanisms described above with respect to FIGS. 5-7D.

As shown, the transceiver 810 may include the modem subsystem 812 and the RF unit 814. The transceiver 810 can be configured to communicate bi-directionally with other devices, such as the UEs 115 and/or BS 800 and/or another core network element. The modem subsystem 812 may be configured to modulate and/or encode data according to a MCS, e.g., a LDPC coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data (e.g., RRC table(s) for channel access configurations, scheduling grants, channel access configuration activation, RRC configurations, PDSCH data, PDCCH DCI, etc.) from the modem subsystem 812 (on outbound transmissions) or of transmissions originating from another source such as a UE 115, 215, and/or UE 900. The RF unit 814 may be further configured to perform analog beamforming in conjunction with the digital beamforming. Although shown as integrated together in transceiver 810, the modem subsystem 812 and/or the RF unit 814 may be separate devices that are coupled together at the BS 800 to enable the BS 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices and provide the received data messages for processing and/or demodulation at the transceiver 810. The transceiver 810 may provide the demodulated and decoded data (e.g., channel sensing reports, PUCCH UCI, PUSCH data, etc.) to the timing advance module 808 for processing. The antennas 816 may include multiple antennas of similar or different designs in order to sustain multiple transmission links.

In an aspect, the BS 800 can include multiple transceivers 810 implementing different RATs (e.g., NR and LTE). In an aspect, the BS 800 can include a single transceiver 810 implementing multiple RATs (e.g., NR and LTE). In an aspect, the transceiver 810 can include various components, where different combinations of components can implement different RATs.

Further, in some aspects, the processor 802 is coupled to the memory 804 and the transceiver 810. The processor 802 is configured to communicate, with a second wireless communication device via the transceiver 810, a plurality of channel access configurations. The processor 802 is further configured to communicate, with the second wireless communication device via the transceiver 810, a scheduling grant for communicating a communication signal in an unlicensed band, where the scheduling grant includes an indication of a first channel access configuration of the plurality of channel access configurations. The processor 802 is further configured to communicate, with the second wireless communication device in the unlicensed band via the transceiver 810 based on the first channel access configuration, the communication signal.

Figure 9:
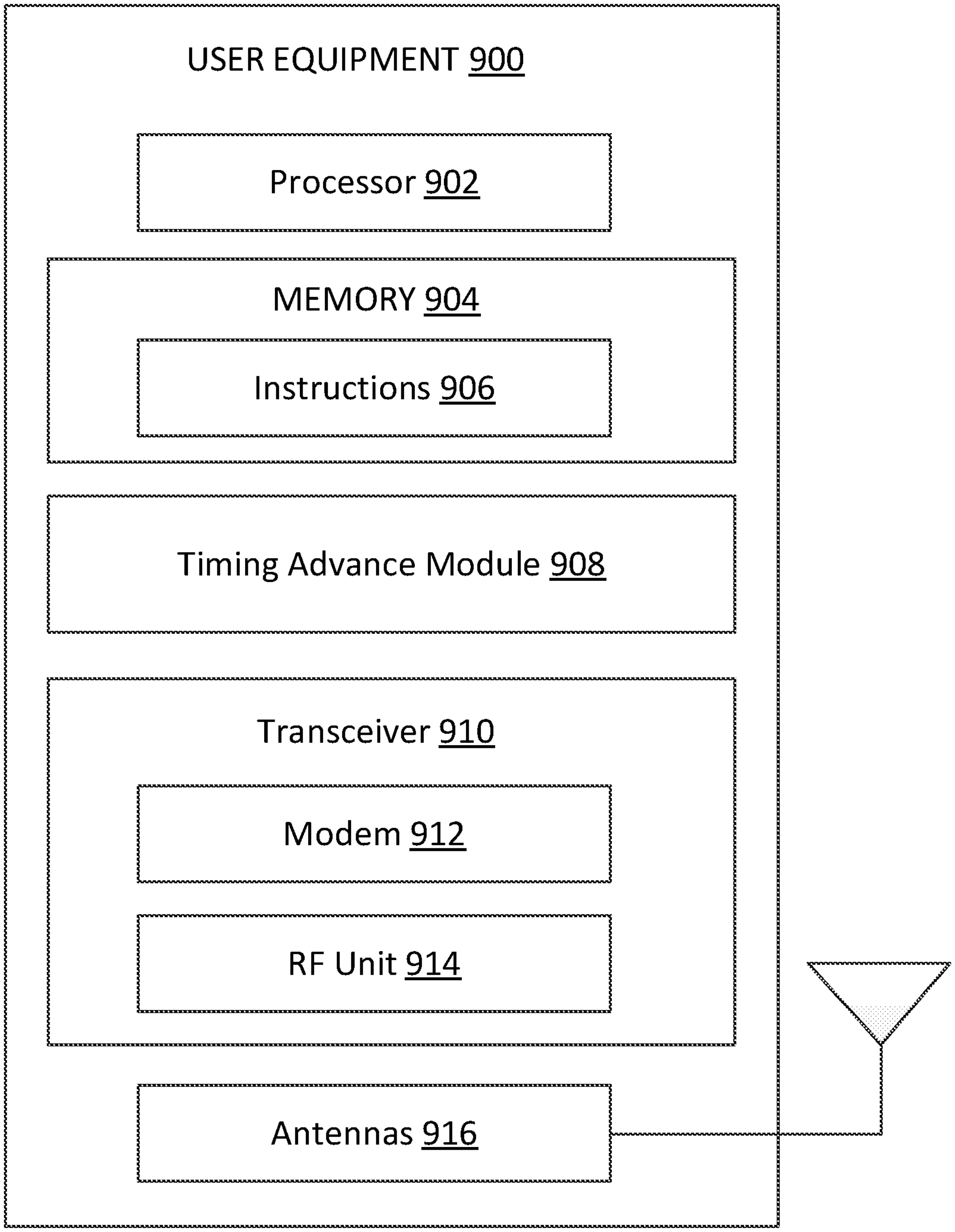
FIG. 9 illustrates a block diagram of a user equipment (UE) according to some aspects of the present disclosure.

FIG. 9 is a block diagram of an exemplary UE 900 according to some aspects of the present disclosure. The UE 900 may be a UE 115 as discussed in FIG. 1 or a UE 515 as discussed in FIG. 5. As shown, the UE 900 may include a processor 902, a memory 904, a timing advance module 908, a transceiver 910 including a modem subsystem 912 and a radio frequency (RF) unit 914, and one or more antennas 916. These elements may be coupled with one another. The term "coupled" may refer to directly or indirectly coupled or connected to one or more intervening elements. For instance, these elements may be in direct or indirect communication with each other, for example via one or more buses.

The processor 902 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 904 includes a non-transitory computer-readable medium. The memory 904 may store, or have recorded thereon, instructions 906. The instructions 906 may include instructions that, when executed by the processor 902, cause the processor 902 to perform the operations described herein with reference to a UE 115 or an anchor in connection with aspects of the present disclosure, for example, aspects of FIGS. 1-6 and 9. Instructions 906 may also be referred to as code, which may be interpreted broadly to include any type of computer-readable statement(s) as discussed above with respect to FIG. 8.

The timing advance module 908 may be implemented via hardware, software, or combinations thereof. For example, the timing advance module 908 may be implemented as a processor, circuit, and/or instructions 906 stored in the memory 904 and executed by the processor 902. In some aspects, the timing advance module 908 can be integrated within the modem subsystem 912. For example, the timing advance module 908 can be implemented by a combination of software components (e.g., executed by a DSP or a general processor) and hardware components (e.g., logic gates and circuitry) within the modem subsystem 912. The timing advance module 908 may communicate with one or more components of UE 900 to implement various aspects of the present disclosure, for example, aspects of FIGS. 5-7D.

In some aspects, the timing advance module 908 is configured to receive a plurality of timing advance group (TAG) indicators, wherein each TAG indicator is associated with at least one cell of a plurality of cells, and wherein at least one of the plurality of cells is associated with multiple TAG indicators. For example, in some aspects, the timing advance module 908 is configured to receive a downlink control channel configuration for one or more cells. Each of the cells may be associated with a frequency band, such as a component carrier (CC) and/or a bandwidth part (BWP). The timing advance module 908 may be configured for carrier aggregation, by which the UE 900 can communicate with one or more transmission reception points (TRPs) using two or more serving cells. The cells may include, for example, a PCell, one or more SCells, a PSCell, and/or a PSCell. In some aspects, the timing advance module 908 is configured to receive a downlink control channel configuration for each of the two or more cells. In some aspects, the timing advance module 908 is configured to receive a downlink control channel configuration for the at least of the plurality of cells, where the downlink control channel configuration indicates, for the at least one cell, two downlink control channel monitoring configurations, and two TAG indicators. In some aspects, the downlink control channel configuration may indicate a first CORESET pool index and a first TAG indicator, and a second CORESET pool index and a second TAG indicator. In some aspects, the timing advance module 908 is configured to receive CORESET pool index values and/or TAG indicators for each other serving cell on which the UE is configured to communicate.

In some aspects, the timing advance module 908 is configured to receive one or more radio resource control (RRC) information elements (IEs) indicating one or more DL control channel configurations, such as DL control channel monitoring configurations. The DL control channel configurations may include or indicate the plurality of TAG indicators. The DL control channel configurations may also include or indicate one or more CORESET pool index values. The TAG indicators and/or the CORESET pool index values may be configured and/or indicated for each serving cell of the UE 900. In some aspects, more than one configured serving cell may be configured or associated with a same TAG indicator and/or a same CORESET pool index.

As explained above, in some aspects, the timing advance module 908 may be configured for multi-TRP communications in which the timing advance module 908 is configured to receive the plurality of TAG indicators from one or more TRPs over one or more serving cells. In some aspects, the timing advance module 908 is configured for single-DCI multi-TRP communication, or multi-DCI (mDCI) multi-TRP communication. In some aspects, at least one of the plurality of cells being associated with the multiple TAG indicators may indicate that the timing advance module 908 is configured for mDCI multi-TRP communication. Accordingly, the timing advance module 908 may configured to receive DCI from each of two or more TRPs, where each DCI schedules DL and/or UL resources for the corresponding TRP.

In some aspects, the timing advance module 908 is configured to transmit, at a first time based on a first TAG indicator associated with a first reference cell of the plurality of cells, a first communication signal, where the first reference cell is based on a number of TAG indicators associated with at least one of the plurality of cells. In this regard, the timing advance module 908 may be configured to communicate the first communication signal based on a timing advance. The timing advance may be based on a DL reference timing corresponding to at least one of the plurality of cells. For example, the DL reference timing may correspond to the timing of a received DL communication signal (e.g., DCI, PDSCH data, DL reference signals, SSB, etc.) on a reference cell. In this regard, the timing advance module 908 may be configured to select or determine the reference cell for the DL reference timing and timing advance determinations. In some aspects, a same reference cell may be determined or selected to determine timing advances for multiple cells, TAGs, and/or TRPs. In other aspects, a single reference cell is selected to determining timing advances for communications associated with all serving cells, associated TAGs, and/or TRPs in the communication scenario. For example, the timing advance module 908 may be configured to select the reference cell based on one or more aspects of the method 500 and the schemes shown in FIGS. 6A-6E. Further, the timing advance module 908 may be configured to determine a DL reference timing according to the method 500 and/or the schemes shown in FIGS. 7A-7D, for example. In another aspect, the timing advance module 908 may be configured to select one or more reference cells and to determine one or more reference timings as described with respect to the method 1000, for example.

As shown, the transceiver 910 may include the modem subsystem 912 and the RF unit 914. The transceiver 910 can be configured to communicate bi-directionally with other devices, such as the BSs 105 and 800. The modem subsystem 912 may be configured to modulate and/or encode the data from the memory 904 and/or the timing advance module 908 according to a modulation and coding scheme (MCS), e.g., a low-density parity check (LDPC) coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data (e.g., channel sensing reports, PUCCH UCI, PUSCH data, etc.) or of transmissions originating from another source such as a UE 115, a BS 105, or an anchor. The RF unit 914 may be further configured to perform analog beamforming in conjunction with the digital beamforming. Although shown as integrated together in transceiver 910, the modem subsystem 912 and the RF unit 914 may be separate devices that are coupled together at the UE 900 to enable the UE 900 to communicate with other devices.

The RF unit 914 may provide the modulated and/or processed data, e.g. data packets (or, more generally, data messages that may contain one or more data packets and other information), to the antennas 916 for transmission to one or more other devices. The antennas 916 may further receive data messages transmitted from other devices. The antennas 916 may provide the received data messages for processing and/or demodulation at the transceiver 910. The transceiver 910 may provide the demodulated and decoded data (e.g., RRC table(s) for channel access configurations, scheduling grants, channel access configuration activation, timing advance configurations, RRC configurations, PUSCH configurations, SRS resource configurations, PUCCH configurations, BWP configurations, PDSCH data, PDCCH DCI, etc.) to the timing advance module 908 for processing. The antennas 916 may include multiple antennas of similar or different designs in order to sustain multiple transmission links.

In an aspect, the UE 900 can include multiple transceivers 910 implementing different RATs (e.g., NR and LTE). In an aspect, the UE 900 can include a single transceiver 910 implementing multiple RATs (e.g., NR and LTE). In an aspect, the transceiver 910 can include various components, where different combinations of components can implement different RATs.

Further, in some aspects, the processor 902 is coupled to the memory 904 and the transceiver 910. The processor 902 is configured to communicate, with a second wireless communication device via the transceiver 910, one or more timing advance configurations and/or one or more cell configurations. The processor 902 may be further configured to select one or more reference cells for communication in a multi-TRP communication scenario, and to determine one or more reference timings and/or one or more timing advances based on the one or more reference cells.

Figure 10:
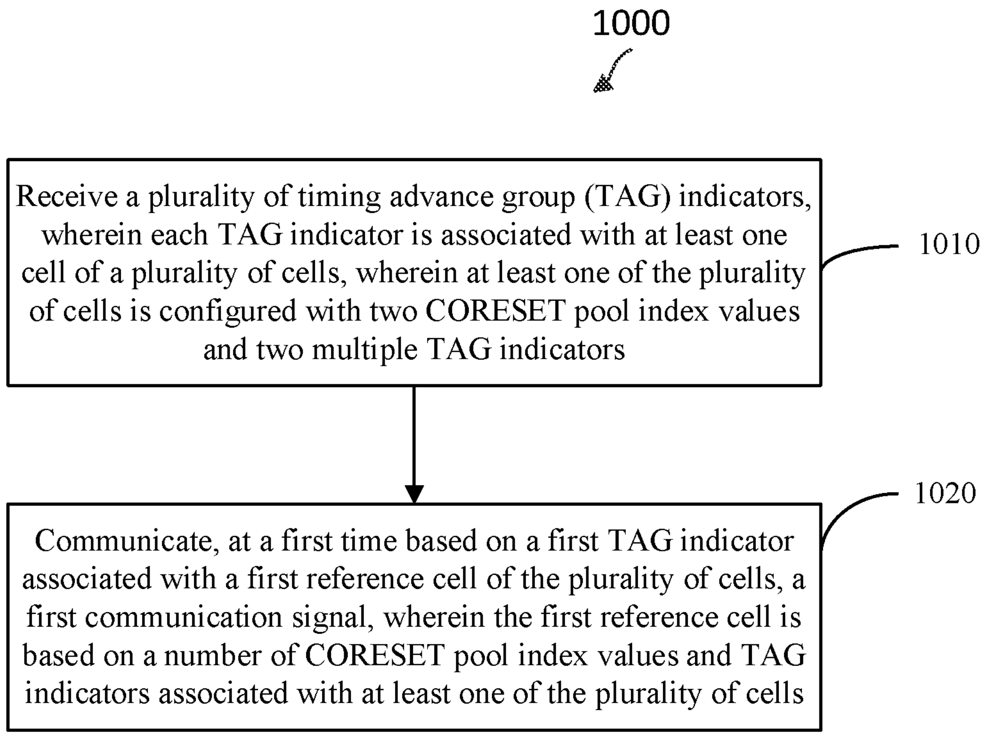
FIG. 10 is a flow diagram of a wireless communication method according to some aspects of the present disclosure.

FIG. 10 is a flow diagram illustrating a wireless communication method 1000 according to some aspects of the present disclosure. Aspects of the method 1000 can be executed by a computing device (e.g., a processor, processing circuit, and/or other suitable component) of a wireless communication device or other suitable means for performing the blocks. In one aspect, a UE, such as one of the UEs 115, 215, 515, and/or 900, may utilize one or more components, such as the processor 902, the memory 904, the timing advance module 908, the transceiver 910, the modem 912, the RF unit 914, and the one or more antennas 916, to execute the blocks of method 1000. The method 1000 may employ similar mechanisms as described in FIGS. 5-7D. As illustrated, the method 1000 includes a number of enumerated blocks, but aspects of the method 1000 may include additional blocks before, after, and in between the enumerated blocks. In some aspects, one or more of the enumerated blocks may be omitted or performed in a different order.

At block 1010, the UE receives a plurality of timing advance group (TAG) indicators, wherein each TAG indicator is associated with at least one cell of a plurality of cells, and wherein at least one of the plurality of cells is associated with multiple TAG indicators. For example, in some aspects, block 1010 includes receiving a downlink control channel configuration for one or more cells. Each of the cells may be associated with a frequency band, such as a component carrier (CC) and/or a bandwidth part (BWP). The UE may be configured for carrier aggregation, by which the UE can communicate with one or more transmission reception points (TRPs) using two or more serving cells. The cells may include, for example, a PCell, one or more SCells, a PSCell, and/or a PSCell. In some aspects, block 1010 includes receiving a downlink control channel configuration for each of the two or more cells. In some aspects, the UE receives a downlink control channel configuration for the at least of the plurality of cells, where the downlink control channel configuration indicates, for the at least one cell, two downlink control channel monitoring configurations, and two TAG indicators. In some aspects, the downlink control channel configuration may indicate a first CORESET pool index and a first TAG indicator, and a second CORESET pool index and a second TAG indicator. In some aspects, block 1010 includes receiving CORESET pool index values and/or TAG indicators for each other serving cell on which the UE is configured to communicate.

In some aspects, block 1010 includes receiving one or more radio resource control (RRC) information elements (IEs) indicating one or more DL control channel configurations, such as DL control channel monitoring configurations. The DL control channel configurations may include or indicate the plurality of TAG indicators. The DL control channel configurations may also include or indicate one or more CORESET pool index values. The TAG indicators and/or the CORESET pool index values may be configured and/or indicated for each serving cell of the UE. In some aspects, more than one configured serving cell may be configured or associated with a same TAG indicator and/or a same CORESET pool index values.

As explained above, in some aspects, the method 1000 may be employed in a multi-TRP communication scenario in which the UE receives the plurality of TAG indicators from one or more TRPs over one or more serving cells. In some aspects, the UE may be configured for single-DCI multi-TRP communication, or multi-DCI (mDCI) multi-TRP communication. In the method 1000, the at least one of the plurality of cells being associated with the multiple TAG indicators may indicate that the UE is configured for mDCI multi-TRP communication. Accordingly, the UE may be configured to receive DCI from each of two or more TRPs, where each DCI schedules DL and/or UL resources for the corresponding TRP. The UE 900 may use any combination of components to perform the actions of block 1010, including the processor 902, the memory 904, the timing advance module 908, the transceiver 910, and/or one or more of the antennas 916.

At block 1020, the method 1000 includes the UE communicating, at a first time based on a first TAG indicator associated with a first reference cell of the plurality of cells, a first communication signal, where the first reference cell is based on a number of TAG indicators associated with at least one of the plurality of cells. In this regard, block 1020 may include communicating the first communication signal based on a timing advance. The timing advance may be based on a DL reference timing corresponding to at least one of the plurality of cells. For example, the DL reference timing may correspond to the timing of a received DL communication signal (e.g., DCI, PDSCH data, DL reference signals, SSB, etc.) on a reference cell. In this regard, block 1020 may include the UE selecting or determining the reference cell for the DL reference timing and timing advance determinations. In some aspects, a same reference cell may be determined or selected to determine timing advances for multiple cells, TAGs, and/or TRPs. In other aspects, a single reference cell is selected to determining timing advances for communications associated with all serving cells, associated TAGs, and/or TRPs in the communication scenario.

Referring to block 1020, in some aspects, communicating the first communication signal includes the UE transmitting the first communication signal to one or more TRPs. In another aspect, the communication the first communication signal includes the UE receiving the first communication signal from the one or more TRPs. For example, block 1020 may include the UE transmitting, to a first TRP, a UL communication. The UL communication may include a UL control channel communication (e.g., PUCCH, UCI), a UL data communication (e.g., PUSCH), and/or one or more UL reference signals (e.g., SRS). The communicating may be based on a timing advance. The timing advance may be determined based on the DL reference timing associated with the first reference cell. For example, the UE may determine the timing advance based on a timing of a received DL signal on the first reference cell, a configured timing advance value, and a configured timing advance offset value. The timing advance value may be associated with a propagation delay of communications between the UE and the target TRP or BS. For example, the method 1000 may include the UE receiving a timing advance configuration indicating a timing advance command. For example, the UE may receive the timing advance configuration during an initial access procedure, such as a random access channel (RACH) procedure. In some aspects, the UE may receive a random access response (RAR) indicating the timing advance command. In another aspect, the UE may receive the timing advance command in a media access control control element (MAC-CE). The UE may communicate the first communication signal based on the determined timing advance. The UE 900 may use any combination of components to perform the actions of block 1020, including the processor 902, the memory 904, the timing advance module 908, the transceiver 910, and/or one or more of the antennas 916.

The method 1000 may include the UE determining or selecting the first reference signal for determining the timing advance based on a number of TAG indicators associated with at least one of the plurality of cells. For example, the UE may select the first reference cell based on whether a cell is configured with two TAG indicators. In another aspect the UE may select the first reference cell based on whether a cell is configured with two DL control monitoring group indicators. For example, the UE may select the first reference cell based on the reference cell being configured with two TAG indicators, and/or based on the first reference cell being configured with two CORESETPoolIndex values. In another aspect, the UE may select the first reference cell based on whether a special cell (SpCell) configured for the UE is configured with two TAG indicators and/or two DL control monitoring group indicators. Various aspects for determining and/or selecting one or more reference cells, including the first reference cell are provided below. Further, aspects for determining reference timings based on the one or more reference cells and/or for determining timing advance are also described below.

In one aspect, the method 1000 includes the UE selecting the first reference cell further based on whether at least one of the plurality of cells is associated with a primary TAG (pTAG) indicator of the plurality of TAG indicators. In some aspects, the UE may be configured with carrier aggregation to communicate using two or more cells. The UE may select one of the two or more cells based on the selected cell being configured with the pTAG. In another example, the method 1000 may include the UE selecting the first reference cell further based on whether at least one of the plurality of cells is a special cell (SpCell). For example, in some aspects, it may be assumed that the network has configured the SpCell with two TAG indicators and/or two CORESET pool index values. Accordingly, the UE may select the SpCell as the reference cell and determining one or more reference timings and/or timing advances based on the configured TAG indicators. In some aspects, selecting the first reference cell includes determining whether a configured SpCell is configured with two TAG indicators and/or two CORESET pool index values. In other words, the UE's default choice for the first reference cell may by the SpCell, on the condition that the SpCell is configured with two TAG indicators and/or two CORESET pool index values. If the SpCell is not configured with two TAG indicators and/or two CORESET pool index values, the UE may select a different serving cell that is configured with two TAG indicators and/or two CORESET pool index values. For example, the UE may select, as the first reference cell, a serving secondary cell (SCell) that is configured with two TAG indicators and/or two CORESET pool index values.

In some aspects, the method 1000 may further include selecting a second reference cell for determining DL reference timings for communications with one or more TRPs. For example, the method 1000 may include the UE selecting the first reference cell based on one or more of the approaches described above, and selecting a second reference cell based on the second reference cell being configured or associated with a second TAG indicator different from the first TAG indicator associated with the first reference cell. In some instances, the cells configured for multi-TRP communications may not include an SpCell. In this regard, the UE may be configured for multi-TRP communications with a plurality of SCells. The method 1000 may include the UE selecting, from the plurality of SCells, the first reference cell based on a number of TAG indicators and/or CORESET pool index values configured for or associated with the selected first reference cell. In some aspects, the first reference cell is selected based on whether the first TAG indicator indicates a pTAG, and/or whether the pTAG includes an SpCell. In another aspect, the method 1000 further includes selecting, from the plurality of cells, a second reference cell associated with a second TAG indicator different from the first TAG indicator. In some aspects, the second TAG indicator may be associated with a secondary TAG (sTAG). In some aspects, selecting the second reference cell is further based on whether the second TAG associated with the second reference cell indicates a pTAG, and/or whether one or more cells associated with the second TAG indicator includes an SpCell.

In another aspect, the first reference cell is associated with the first TAG indicator, a first CORESET pool index value, a second TAG indicator different from the first TAG indicator, and a second CORESET pool index value. Block 1020 may include communicating the first communication signal based on a first reference timing associated with the first CORESET pool index value. The method 1000 may further include communicating, at a second time, a second communication signal based on a second reference timing associated with the second CORESET pool index value. In another aspect, the communicating the first communication signal at the first time is based on a first reference timing associated with the first CORESET pool index value, and the method 1000 further comprises the UE communicating, at a second time, a second communication signal based on the first reference timing associated with the first CORESET pool index value. In another aspect, the method 1000 further includes the UE communicating, at a second time, a second communication signal based on a second reference timing associated with a second CORESET pool index value, wherein the second reference timing is associated with a second reference cell different from the first reference cell.

In another aspect, the first reference cell is selected by the UE for communications associated with the first TAG indicator, and the first reference cell is configured with the first TAG indicator, a second TAG indicator, a first CORESET pool index value, and a second CORESET pool index value. In some aspects, the method 1000 includes the UE: receiving a first downlink (DL) signal associated with the first CORESET pool index value, the first CORESET pool index value associated with the first TAG indicator; and receiving a second DL signal associated with a second CORESET pool index value, the second CORESET pool index value associated with the second TAG indicator. In some aspects, the communicating the first communication signal at the first time is based on a first reference timing associated with a first detected path in time of the first DL signal.

In another aspect, the second reference cell for the second TAG indicator is configured with two CORESET pool index values and associated with the second TAG indicator and a third TAG indicator, and the method 1000 further comprises: receiving a first downlink (DL) signal associated with a first CORESET pool index value, the first CORESET pool index value associated with the third TAG indicator; and receiving a second DL signal associated with a second CORESET pool index value, the second CORESET pool index value associated with the second TAG indicator. In some aspects, the communicating the first communication signal at the first time is based on a first reference timing associated with a first detected path in time of the second DL signal.

In another aspect, at least two of the plurality of serving cells may be associated with the first TAG indicator. The method 1000 may include the UE selecting the first reference cell for communications associated with the first TAG indicator. The method 1000 may further include the UE selecting a second reference cell associated with a second TAG indicator different from the first TAG indicator. Accordingly, the UE may determine timing advances for communications associated with the second TAG indicator using the second reference cell for reference timing determination.

Figure 11:
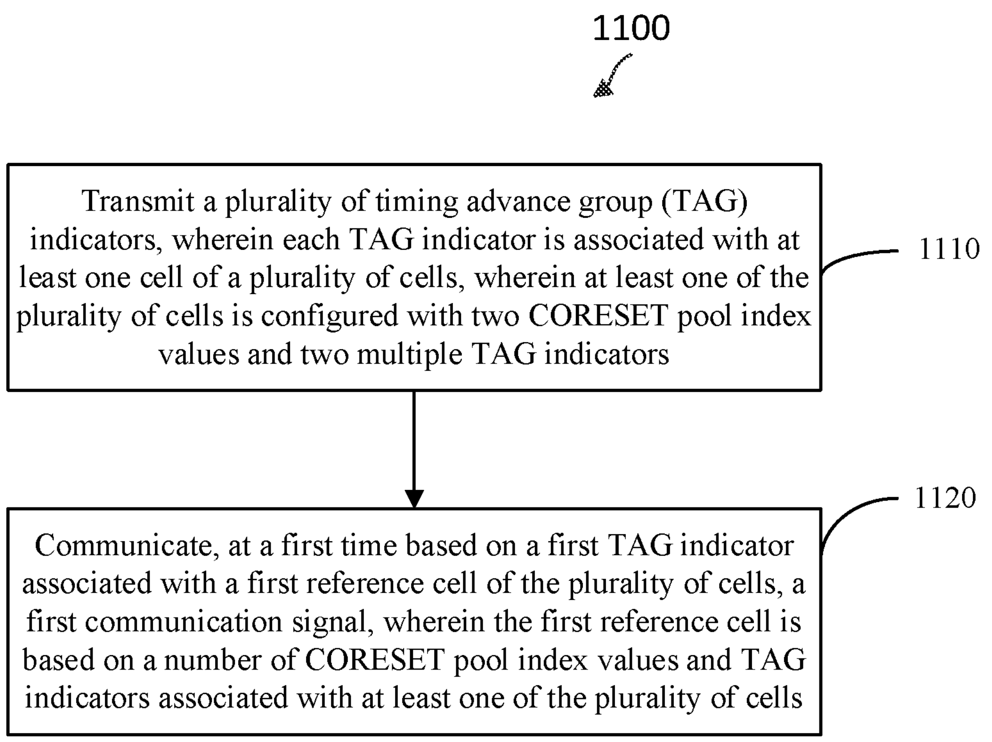
FIG. 11 is a flow diagram of a wireless communication method according to some aspects of the present disclosure.

FIG. 11 is a flow diagram illustrating a wireless communication method 1100 according to some aspects of the present disclosure. Aspects of the method 1100 can be executed by a computing device (e.g., a processor, processing circuit, and/or other suitable component) of a wireless communication device or other suitable means for performing the blocks. In one aspect, a BS, such as one of the BSs 105 and/or 800, may utilize one or more components, such as the processor 802, the memory 804, the timing advance module 808, the transceiver 810, the modem 812, the RF unit 814, and the one or more antennas 816, to execute the blocks of method 1100. The method 1100 may employ similar mechanisms as described in FIGS. 5-7D. In some aspects, the BS may be configured as one of a plurality of transmission-reception points (TRPs) in a multi-TRP communication scenario. Accordingly, aspects of the method 1100 may be described with reference to one or more TRPs and one or more UEs. As illustrated, the method 1100 includes a number of enumerated blocks, but aspects of the method 1100 may include additional blocks before, after, and in between the enumerated blocks. In some aspects, one or more of the enumerated blocks may be omitted or performed in a different order.

At block 1110, a TRP transmits, to a UE, a plurality of timing advance group (TAG) indicators, wherein each TAG indicator is associated with at least one cell of a plurality of cells, and wherein at least one of the plurality of cells is associated with multiple TAG indicators. For example, in some aspects, block 1110 includes transmitting a downlink control channel configuration for one or more cells. Each of the cells may be associated with a frequency band, such as a component carrier (CC) and/or a bandwidth part (BWP). The UE may be configured for carrier aggregation, by which the UE can communicate with one or more TRPs using two or more serving cells. The cells may include, for example, a PCell, one or more SCells, a PSCell, and/or a PSCell. In some aspects, block 1110 includes transmitting a downlink control channel configuration for each of the two or more cells. In some aspects, the TRP transmits a downlink control channel configuration for the at least of the plurality of cells, where the downlink control channel configuration indicates, for the at least one cell, two downlink control channel monitoring configurations, and two TAG indicators. In some aspects, the downlink control channel configuration may indicate a first CORESET pool index value and a first TAG indicator, and a second CORESET pool index value and a second TAG indicator. In some aspects, block 1110 includes transmitting CORESET pool index values and/or TAG indicators for each other serving cell on which the TRP is configured to communicate.

In some aspects, block 1110 includes transmitting one or more radio resource control (RRC) information elements (IEs) indicating one or more DL control channel configurations, such as DL control channel monitoring configurations. The DL control channel configurations may include or indicate the plurality of TAG indicators. The DL control channel configurations may also include or indicate one or more CORESET pool index values. The TAG indicators and/or the CORESET pool index value may be configured and/or indicated for each serving cell of the UE. In some aspects, more than one configured serving cell may be configured or associated with a same TAG indicator and/or a same CORESET pool index value.

As explained above, in some aspects, the method 1100 may be employed in a multi-TRP communication scenario in which the TRP is one of multiple TRPs configured for communication with one or more UEs and transmits the plurality of TAG indicators over one or more serving cells. In some aspects, the TRP may be configured for single-DCI multi-TRP communication, or multi-DCI (mDCI) multi-TRP communication. In the method 1100, the at least one of the plurality of cells being associated with the multiple TAG indicators may indicate that a cell is configured for mDCI multi-TRP communication. Accordingly, the TRP may be configured to transmit DCI scheduling DL and/or UL resources, while other TRPs in the multi-TRP communication scenario may also be configured to transmit DCI scheduling DL and/or UL resources for communications with the UE. The TRP may use any combination of components to perform the actions of block 1110, including the processor 802, the memory 804, the timing advance module 808, the transceiver 810, and/or one or more of the antennas 816 of the BS 800.

At block 1120, the method 1100 includes the TRP communicating, at a first time based on a first TAG indicator associated with a first reference cell of the plurality of cells, a first communication signal, where the first reference cell is based on a number of TAG indicators associated with at least one of the plurality of cells. In this regard, block 1120 may include communicating the first communication signal based on a timing advance. The timing advance may be based on a DL reference timing corresponding to at least one of the plurality of cells. For example, the DL reference timing may correspond to the timing of a received DL communication signal (e.g., DCI, PDSCH data, DL reference signals, SSB, etc.) on a reference cell. In this regard, the method 1100 may include or determining the reference cell for the DL reference timing and timing advance determinations. In some aspects, a same reference cell may be determined or selected to determine timing advances for multiple cells, TAGs, and/or TRPs. In other aspects, a single reference cell is selected to determining timing advances for communications associated with all serving cells, associated TAGs, and/or TRPs in the communication scenario.

Referring to block 1120, in some aspects, communicating the first communication signal includes the TRP receiving a UL communication from the UE. In another aspect, the communication the first communication signal includes the UE receiving the first communication signal from the one or more TRPs. For example, block 1120 may include the TRP receiving, from the UE, a UL communication. The UL communication may include a UL control channel communication (e.g., PUCCH, UCI), a UL data communication (e.g., PUSCH), and/or one or more UL reference signals (e.g., SRS). The communicating may be based on a timing advance. The timing advance may be determined based on the DL reference timing associated with the first reference cell. For example, the TRP may transmit a timing advance configuration to the UE based on a timing of a transmitted DL signal on the first reference cell, a configured timing advance value, and a configured timing advance offset value. The timing advance value may be associated with a propagation delay of communications between the UE and the TRP. For example, the method 1100 may include the TRP transmitting a timing advance configuration indicating a timing advance command. For example, the UE may receive the timing advance configuration during an initial access procedure, such as a random access channel (RACH) procedure. In some aspects, the TRP may transmit a random access response (RAR) indicating the timing advance command. In another aspect, the TRP may transmit the timing advance command in a media access control control element (MAC-CE). The TRP may communicate the first communication signal based on the determined timing advance. The TRP may use any combination of components to perform the actions of block 1120, including the processor 802, the memory 804, the timing advance module 808, the transceiver 810, and/or one or more of the antennas 816 of the BS 800.

As explained above, the network may determine and indicate timing advance commands based on known reference cell selection criteria used by the UE. For example, the network may determine the reference cell using similar or identical techniques as described above with respect to FIGS. 5-7D. For example, in some aspects, the UE may be configured to select the SpCell as a reference cell for mDCI multi-TRP communications, and the TRP may transmit a cell configuration for the SpCell indicating two TAG indicators and/or two CORESET pool index values. Accordingly, the UE may select the SpCell as the reference cell and determining one or more reference timings and/or timing advances based on the configured TAG indicators.

EXEMPLARY ASPECTS OF THE DISCLOSURE

Aspect 1. A method of wireless communication performed by a wireless communication device, the method comprising: communicating a plurality of timing advance group (TAG) indicators, wherein each TAG indicator is associated with at least one cell of a plurality of cells, wherein at least one of the plurality of cells is configured with two CORESET pool index values and two TAG indicators; and communicating, at a first time based on a first TAG indicator associated with a first reference cell of the plurality of cells, a first communication signal, wherein the first reference cell is based on at least one of a number of CORESET pool index values or a number of TAG indicators associated with at least one of the plurality of cells.

Aspect 2. The method of aspect 1, wherein the first reference cell is further based on whether at least one of the plurality of cells is associated with a primary TAG (pTAG) indicator of the plurality of TAG indicators.

Aspect 3. The method of aspect 1, wherein the first reference cell is further based on whether at least one of the plurality of cells is a special cell (SpCell).

Aspect 4. The method of aspect 3, wherein at least one of the plurality of cells is the SpCell, and wherein the first reference cell is further based on whether the SpCell is configured with the two CORESET pool index values and two TAG indicators.

Aspect 5. The method of aspect 3, wherein the SpCell is configured with a single CORESET pool index value and a single TAG indicator of the plurality of TAG indicators, and wherein the first reference cell is a secondary cell (SCell) associated with the two TAG indicators.

Aspect 6. The method of aspect 3, wherein the first reference cell is the SpCell, and wherein the method further comprises: selecting, from one or more SCells of the plurality of cells, a second reference cell associated with a second TAG indicator different from the first TAG indicator.

Aspect 7. The method of aspect 3, wherein the method further comprises: selecting, from one or more SCells of the plurality of cells, the first reference cell based on at least one of a number of CORESET pool index values or a number of TAG indicators associated with each of the one or more SCells.

Aspect 8. The method of aspect 1, further comprising: selecting, from a plurality of cells associated with the first TAG indicator, the first reference cell for the first TAG indicator.

Aspect 9. The method of aspect 8, wherein the selecting the first reference cell is further based on one or more of the following: whether the first TAG is a primary TAG (pTAG); or whether the plurality of cells associated with the first TAG indicator includes a special cell (SpCell).

Aspect 10. The method of aspect 8, further comprising: selecting, from a plurality of cells associated with a second TAG indicator different from the first TAG indicator, a second reference cell for the second TAG indicator.

Aspect 11. The method of aspect 10, wherein the selecting the second reference cell is further based on one or more of the following: whether the second TAG is pTAG; or whether the plurality of cells associated with the second TAG indicator includes a SpCell.

Aspect 12. The method of aspect 1, wherein the first reference cell is associated with the first TAG indicator and a second TAG indicator different from the first TAG indicator, wherein the first TAG indicator is associated with a first CORESET pool index value, wherein the second TAG indicator is associated with a second CORESET pool index value, wherein the communicating the first communication signal at the first time is based on a first reference timing associated with the first CORESET pool index value, and wherein the method further comprises: communicating, at a second time, a second communication signal, wherein the communicating second first communication signal at the second time is based on a second reference timing associated with the second CORESET pool index value.

Aspect 13. The method of aspect 1, wherein the first reference cell is associated with the first TAG indicator and a second TAG indicator, wherein the first TAG indicator is associated with a first CORESET pool index value, wherein the second TAG indicator is associated with a second CORESET pool index value, wherein the communicating the first communication signal at the first time is based on a first reference timing associated with the first CORESET pool index value, and wherein the method further comprises: communicating, at a second time, a second communication signal, wherein the communicating the second communication signal at the second time is based on the first reference timing associated with the first CORESET pool index value.

Aspect 14. The method of aspect 1, wherein the communicating the first communication signal at the first time is based on a first reference timing associated with a first CORESET pool index value, and wherein the method further comprises: communicating, at a second time, a second communication signal, wherein the communicating the second communication signal at the second time is based on a second reference timing associated with a second CORESET pool index value, wherein the second CORESET pool index value is associated with a second reference cell different from the first reference cell.

Aspect 15. The method of aspect 1, wherein the first reference cell is configured with a first CORESET pool index value, and a second CORESET pool index value, wherein the method further comprises: communicating a first downlink (DL) signal associated with the first CORESET pool index value, the first CORESET pool index value associated with the first TAG indicator; communicating a second DL signal associated with the second CORESET pool index value, the second CORESET pool index value associated with a second TAG indicator, and wherein the communicating the first communication signal at the first time is based on a first reference timing associated with a first detected path in time of the first DL signal.

Aspect 16. The method of aspect 1, further comprising: selecting the first reference cell for the first TAG indicator; selecting a second reference cell for a second TAG indicator, wherein the second reference cell is configured with two CORESET pool index values, the second TAG indicator, and a third TAG indicator; receiving a first downlink (DL) signal associated with a first CORESET pool index value, the first CORESET pool index value associated with the third TAG indicator; and receiving a second DL signal associated with a second CORESET pool index value, the second CORESET pool index value associated with the second TAG indicator, and wherein the communicating the first communication signal at the first time is based on a first reference timing associated with a first detected path in time of the second DL signal.

Aspect 17. A wireless communication device comprising a transceiver and a processor in communication with the transceiver, wherein the wireless communication device is configured to perform the actions of any of aspects 1-16.

Aspect 18. A non-transitory, computer-readable medium having program code recorded therein, wherein the program code comprises instructions executable by a processor of a wireless communication device to cause the wireless communication device to perform the actions of any of aspects 1-16.

A wireless communication device comprising means for perform the actions of any of aspects 1-16.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving a plurality of timing advance group (TAG) indicators, wherein each TAG indicator is associated with at least one cell of a plurality of cells, wherein at least one of the plurality of cells is configured with two control resource set (CORESET) pool index values and two TAG indicators; and communicating, at a first time based on a first TAG indicator associated with a first reference cell of the plurality of cells, a first communication signal, wherein the first reference cell is based on a number of CORESET pool index values and TAG indicators associated with at least one of the plurality of cells.

2. The method of claim 1, wherein the first reference cell is further based on whether at least one of the plurality of cells is associated with a primary TAG (pTAG) indicator of the plurality of TAG indicators.

3. The method of claim 1, wherein the first reference cell is further based on whether at least one of the plurality of cells is a special cell (SpCell).

4. The method of claim 3, wherein at least one of the plurality of cells is the SpCell, and wherein the first reference cell is further based on whether the SpCell is configured with the two CORESET pool index values and two TAG indicators.

5. The method of claim 3, wherein the SpCell is configured with a single CORESET pool index value and a single TAG indicator of the plurality of TAG indicators, and wherein the first reference cell is a secondary cell (SCell) associated with the two TAG indicators.

6. The method of claim 3, wherein the first reference cell is the SpCell, and wherein the method further comprises:

selecting, from one or more SCells of the plurality of cells, a second reference cell associated with a second TAG indicator different from the first TAG indicator.

7. The method of claim 3, wherein the method further comprises:

selecting, from one or more SCells of the plurality of cells, the first reference cell based on at least one of a number of CORESET pool index values or a number of TAG indicators associated with each of the one or more SCells.

8. The method of claim 1, further comprising:

selecting, from a plurality of cells associated with the first TAG indicator, the first reference cell for the first TAG indicator.

9. The method of claim 8, wherein the selecting the first reference cell is further based on one or more of:

whether the first TAG is a primary TAG (pTAG); or whether the plurality of cells associated with the first TAG indicator includes a special cell (SpCell).

10. The method of claim 8, further comprising:

selecting, from a plurality of cells associated with a second TAG indicator different from the first TAG indicator, a second reference cell for the second TAG indicator.

11. The method of claim 10, wherein the selecting the second reference cell is further based on one or more of:

whether the second TAG is pTAG; or whether the plurality of cells associated with the second TAG indicator includes a SpCell.

12. The method of claim 1, wherein the first reference cell is associated with the first TAG indicator and a second TAG indicator different from the first TAG indicator, wherein the first TAG indicator is associated with a first CORESET pool index value, wherein the second TAG indicator is associated with a second CORESET pool index value, wherein the communicating the first communication signal at the first time is based on a first reference timing associated with the first CORESET pool index value, and wherein the method further comprises:

communicating, at a second time, a second communication signal, wherein the communicating second first communication signal at the second time is based on a second reference timing associated with the second CORESET pool index value.

13. The method of claim 1, wherein the first reference cell is associated with the first TAG indicator and a second TAG indicator, wherein the first TAG indicator is associated with a first CORESET pool index value, wherein the second TAG indicator is associated with a second CORESET pool index value, wherein the communicating the first communication signal at the first time is based on a first reference timing associated with the first CORESET pool index value, and wherein the method further comprises:

communicating, at a second time, a second communication signal, wherein the communicating the second communication signal at the second time is based on the first reference timing associated with the first CORESET pool index value.

14. The method of claim 1, wherein the communicating the first communication signal at the first time is based on a first reference timing associated with a first CORESET pool index value, and wherein the method further comprises:

communicating, at a second time, a second communication signal, wherein the communicating the second communication signal at the second time is based on a second reference timing associated with a second CORESET pool index value, wherein the second CORESET pool index value is associated with a second reference cell different from the first reference cell.

15. The method of claim 1, wherein the first reference cell is configured with a first CORESET pool index value, and a second CORESET pool index value, wherein the method further comprises:

receiving a first downlink (DL) signal associated with the first CORESET pool index value, the first CORESET pool index value associated with the first TAG indicator; and receiving a second DL signal associated with the second CORESET pool index value, the second CORESET pool index value associated with a second TAG indicator, and wherein the communicating the first communication signal at the first time is based on a first reference timing associated with a first detected path in time of the first DL signal.

16. The method of claim 1, further comprising:

selecting the first reference cell for the first TAG indicator;

selecting a second reference cell for a second TAG indicator, wherein the second reference cell is configured with two CORESET pool index values, the second TAG indicator, and a third TAG indicator;

receiving a first downlink (DL) signal associated with a first CORESET pool index value, the first CORESET pool index value associated with the third TAG indicator; and receiving a second DL signal associated with a second CORESET pool index value, the second CORESET pool index value associated with the second TAG indicator, and wherein the communicating the first communication signal at the first time is based on a first reference timing associated with a first detected path in time of the second DL signal.

17. A user equipment (UE), comprising:

a transceiver; and a processor in communication with the transceiver, wherein the UE is configured to:

receive a plurality of timing advance group (TAG) indicators, wherein each TAG indicator is associated with at least one cell of a plurality of cells, wherein at least one of the plurality of cells is configured with two control resource set (CORESET) pool index values and two TAG indicators; and communicate, at a first time based on a first TAG indicator associated with a first reference cell of the plurality of cells, a first communication signal, wherein the first reference cell is based on a number of CORESET pool index values and TAG indicators associated with at least one of the plurality of cells.

18. The UE of claim 17, wherein the first reference cell is further based on whether at least one of the plurality of cells is associated with a primary TAG (pTAG) indicator of the plurality of TAG indicators.

19. The UE of claim 17, wherein the first reference cell is further based on whether at least one of the plurality of cells is a special cell (SpCell).

20. The UE of claim 19, wherein at least one of the plurality of cells is the SpCell, and wherein the first reference cell is further based on whether the SpCell is configured with the two CORESET pool index values and two TAG indicators.

21. The UE of claim 19, wherein the SpCell is configured with a single CORESET pool index value and a single TAG indicator of the plurality of TAG indicators, and wherein the first reference cell is a secondary cell (SCell) associated with the two TAG indicators.

22. The UE of claim 19, wherein the first reference cell is the SpCell, and wherein the processor and the transceiver are further configured to:

select, from one or more SCells of the plurality of cells, a second reference cell associated with a second TAG indicator different from the first TAG indicator.

23. The UE of claim 19, wherein the processor and the transceiver are further configured to:

select, from one or more SCells of the plurality of cells, the first reference cell based on at least one of a number of CORESET pool index values or a number of TAG indicators associated with each of the one or more SCells.

24. The UE of claim 17, wherein the processor and the transceiver are further configured to:

select, from a plurality of cells associated with the first TAG indicator, the first reference cell for the first TAG indicator.

25. The UE of claim 24, wherein the processor and the transceiver are further configured to:

select, from a plurality of cells associated with a second TAG indicator different from the first TAG indicator, a second reference cell for the second TAG indicator.

26. The UE of claim 17, wherein the first reference cell is associated with the first TAG indicator and a second TAG indicator different from the first TAG indicator, wherein the first TAG indicator is associated with a first CORESET pool index value, wherein the second TAG indicator is associated with a second CORESET pool index value, wherein the processor and transceiver are configured to communicate the first communication signal at the first time based on a first reference timing associated with the first CORESET pool index value, and wherein the processor and the transceiver are further configured to:

communicate, at a second time, a second communication signal, wherein the communicating second first communication signal at the second time is based on a second reference timing associated with the second CORESET pool index value.

27. The UE of claim 17, wherein the first reference cell is associated with the first TAG indicator and a second TAG indicator, wherein the first TAG indicator is associated with a first CORESET pool index value, wherein the second TAG indicator is associated with a second CORESET pool index value, wherein the processor and the transceiver are configured to communicate the first communication signal at the first time based on a first reference timing associated with, and wherein the processor and the transceiver are further configured to:

communicate, at a second time, a second communication signal based on the first reference timing associated with the first CORESET pool index value.

28. The UE of claim 17, wherein the processor and the transceiver are configured to communicate the first communication signal at the first time based on a first reference timing associated with a first CORESET pool index value, and wherein the processor and the transceiver are further configured to:

communicate, at a second time, a second communication signal based on a second reference timing associated with a second CORESET pool index value, wherein the second CORESET pool index value is associated with a second reference cell different from the first reference cell.

29. A non-transitory, computer-readable medium having program code recorded thereon, wherein the program code comprises instructions executable by a processor of a user equipment (UE) to cause the UE to:

receive a plurality of timing advance group (TAG) indicators, wherein each TAG indicator is associated with at least one cell of a plurality of cells, wherein at least one of the plurality of cells is configured with two CORESET pool index values and two TAG indicators; and communicate, at a first time based on a first TAG indicator associated with a first reference cell of the plurality of cells, a first communication signal, wherein the first reference cell is based on a number of CORESET pool index values and TAG indicators associated with at least one of the plurality of cells.

30. A user equipment (UE), comprising:

means for receiving a plurality of timing advance group (TAG) indicators, wherein each TAG indicator is associated with at least one cell of a plurality of cells, wherein at least one of the plurality of cells is configured with two CORESET pool index values and two TAG indicators; and means for communicating, at a first time based on a first TAG indicator associated with a first reference cell of the plurality of cells, a first communication signal, wherein the first reference cell is based on a number of CORESET pool index values and TAG indicators associated with at least one of the plurality of cells.

* * * * *